United States Patent
Smith et al.

(10) Patent No.: US 11,924,023 B1
(45) Date of Patent: *Mar. 5, 2024

(54) SYSTEMS AND METHODS FOR REDUNDANT NETWORK COMMUNICATION IN A ROBOT

(71) Applicant: Sarcos Corp., Salt Lake City, UT (US)

(72) Inventors: Fraser M. Smith, Salt Lake City, UT (US); Marc X. Olivier, Salt Lake City, UT (US)

(73) Assignee: Sarcos Corp., Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/989,377

(22) Filed: Nov. 17, 2022

(51) Int. Cl.
| | | |
|---|---|---|
| *G06F 15/16* | (2006.01) | |
| *H04L 41/0654* | (2022.01) | |
| *H04L 45/00* | (2022.01) | |
| *H04L 67/12* | (2022.01) | |

(52) U.S. Cl.
CPC .......... *H04L 41/0654* (2013.01); *H04L 45/22* (2013.01); *H04L 67/12* (2013.01)

(58) Field of Classification Search
CPC ...... H04L 41/0654; H04L 45/22; H04L 67/12
See application file for complete search history.

(56) References Cited

U.S. PATENT DOCUMENTS

| | | |
|---|---|---|
| 1,880,138 A | 9/1932 | Franz |
| 2,850,189 A | 9/1958 | Leroy |
| 2,981,198 A | 4/1961 | Nettel |
| 3,171,549 A | 3/1965 | Orloff |
| 3,280,991 A | 10/1966 | Melton et al. |
| 3,306,646 A | 2/1967 | Flora, Jr. |
| 3,358,678 A | 12/1967 | Kulstar |
| 3,449,008 A | 6/1969 | Colechia |
| 3,449,769 A | 6/1969 | Mizen |
| 3,535,711 A | 10/1970 | Fick |

(Continued)

FOREIGN PATENT DOCUMENTS

| | | |
|---|---|---|
| CN | 101214653 A | 7/2008 |
| CN | 101823517 A | 9/2010 |

(Continued)

OTHER PUBLICATIONS

Aghili et al., Sensing the torque in a robot's joints, www.memagazine.org/backissues/september98/features/torque/torque.html, 1998, pp. 1-9, The American Society of Mechanical Engineers.

(Continued)

*Primary Examiner* — Kim T Nguyen

(57) ABSTRACT

A technology is described for redundant network communication in a robot. An example of the technology can include a main robotic controller and a robotic component including a local controller and a controlled component that is operable based on a data signal comprising control instructions executed by the local controller. A command can be sent between the main robotic controller and the local controller. The command can be encoded in a first data signal and a second data signal. The first data signal can be sent over a first network channel, and the second data signal can be sent over a second network channel. The first data signal and the second data signal can be configured to be redundant data signals for the local controller sent respectively over the first network channel and the second network channel.

38 Claims, 13 Drawing Sheets

(56) References Cited

U.S. PATENT DOCUMENTS

| | | |
|---|---|---|
| 3,759,563 A | 9/1973 | Kitamura |
| 3,858,468 A | 1/1975 | Pasbrig |
| 4,046,262 A | 9/1977 | Vykukal et al. |
| 4,179,233 A | 12/1979 | Bromell et al. |
| 4,200,596 A | 4/1980 | Iiyama et al. |
| 4,251,791 A | 2/1981 | Yanagisawa et al. |
| 4,367,891 A | 1/1983 | Wauer et al. |
| 4,398,110 A | 8/1983 | Flinchbaugh et al. |
| 4,483,407 A | 11/1984 | Iwamoto et al. |
| 4,561,686 A | 12/1985 | Atchley |
| 4,567,417 A | 1/1986 | Francois et al. |
| 4,575,297 A | 3/1986 | Richter |
| 4,591,944 A | 5/1986 | Gravel |
| 4,598,601 A | 7/1986 | Molaug |
| 4,603,896 A | 8/1986 | Vasseur et al. |
| 4,661,032 A | 4/1987 | Arai |
| 4,666,357 A | 5/1987 | Babbi |
| 4,723,353 A | 2/1988 | Monforte |
| 4,762,455 A | 8/1988 | Coughlan et al. |
| 4,768,143 A | 8/1988 | Lane et al. |
| 4,821,594 A | 4/1989 | Rosheim et al. |
| 4,834,443 A | 5/1989 | Crowder et al. |
| 4,853,874 A | 8/1989 | Iwamoto et al. |
| 4,883,400 A | 11/1989 | Kuban et al. |
| 4,884,720 A | 12/1989 | Whigham et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,080,682 A | 1/1992 | Schectman |
| 5,101,472 A | 3/1992 | Repperger |
| 5,105,367 A | 4/1992 | Tsuchihashi et al. |
| 5,117,814 A | 6/1992 | Luttrell et al. |
| 5,144,943 A | 9/1992 | Luttrell et al. |
| 5,172,951 A | 12/1992 | Jacobsen et al. |
| 5,230,147 A | 7/1993 | Asaoka et al. |
| 5,239,246 A | 8/1993 | Kim |
| 5,246,216 A | 9/1993 | Oberst |
| 5,280,981 A | 1/1994 | Schulz |
| 5,282,460 A | 2/1994 | Boldt |
| 5,328,224 A | 7/1994 | Jacobsen et al. |
| 5,336,982 A | 8/1994 | Backes |
| 5,389,849 A | 2/1995 | Asano et al. |
| 5,399,951 A | 3/1995 | Lavallee et al. |
| 5,402,690 A | 4/1995 | Sekiguchi et al. |
| 5,516,249 A | 5/1996 | Brimhall |
| 5,577,417 A | 11/1996 | Fournier |
| 5,577,902 A | 11/1996 | Todo et al. |
| 5,588,688 A | 12/1996 | Jacobsen et al. |
| 5,664,636 A | 9/1997 | Ikuma et al. |
| 5,704,945 A | 1/1998 | Wagner et al. |
| 5,762,390 A | 6/1998 | Gosselin et al. |
| 5,784,542 A | 7/1998 | Ohm et al. |
| 5,785,505 A | 7/1998 | Price |
| 5,797,615 A | 8/1998 | Murray |
| 5,845,540 A | 12/1998 | Rosheim |
| 5,865,770 A | 2/1999 | Schectman |
| 5,898,599 A | 4/1999 | Massie et al. |
| 5,912,658 A | 6/1999 | Bergamasco et al. |
| 5,949,686 A | 9/1999 | Yoshinada et al. |
| 5,957,981 A | 9/1999 | Gramnas |
| 5,961,476 A | 10/1999 | Betto et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,202,013 B1 | 3/2001 | Anderson et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,425,865 B1 | 7/2002 | Salcudean et al. |
| 6,430,473 B1 | 8/2002 | Lee et al. |
| 6,435,794 B1 | 8/2002 | Springer |
| 6,507,163 B1 | 1/2003 | Allen |
| 6,508,058 B1 | 1/2003 | Seaverson |
| 6,554,342 B1 | 4/2003 | Burnett |
| 6,641,371 B2 | 11/2003 | Graziani et al. |
| 6,659,703 B1 | 12/2003 | Kirkley |
| 6,659,939 B2 | 12/2003 | Moll et al. |
| 6,663,154 B2 | 12/2003 | Pancheri |
| 6,714,839 B2 | 3/2004 | Salisbury, Jr. et al. |
| 6,740,125 B2 | 5/2004 | Mosler |
| 6,855,170 B2 | 2/2005 | Gramnas |
| 6,920,374 B2 | 7/2005 | Takenaka et al. |
| 7,168,748 B2 | 1/2007 | Townsend et al. |
| 7,319,919 B2 | 1/2008 | Takenaka et al. |
| 7,337,040 B2 | 2/2008 | Takenaka et al. |
| 7,379,789 B2 | 5/2008 | Takenaka et al. |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,509,905 B2 | 3/2009 | Jacobsen et al. |
| 7,628,766 B1 | 12/2009 | Kazerooni et al. |
| 7,783,384 B2 | 8/2010 | Kraft |
| 7,862,522 B1 | 1/2011 | Barclay et al. |
| 7,862,524 B2 | 1/2011 | Carignan et al. |
| 7,883,546 B2 | 2/2011 | Kazerooni et al. |
| 7,947,004 B2 | 5/2011 | Kazerooni et al. |
| 7,965,006 B2 | 6/2011 | Kang et al. |
| 8,024,071 B2 | 9/2011 | Komatsu et al. |
| 8,051,764 B2 | 11/2011 | Jacobsen et al. |
| 8,100,451 B2 | 1/2012 | Okuda et al. |
| 8,112,179 B2 | 2/2012 | Nakajima |
| 8,132,835 B2 | 3/2012 | Ban et al. |
| 8,151,401 B2 | 4/2012 | Cheyne |
| 8,182,010 B2 | 5/2012 | Lee et al. |
| 8,204,626 B2 | 6/2012 | Yoshiike et al. |
| 8,245,728 B2 | 8/2012 | Jacobsen et al. |
| 8,295,975 B2 | 10/2012 | Arimatsu et al. |
| 8,336,420 B2 | 12/2012 | Carter et al. |
| 8,375,982 B2 | 2/2013 | Gray, Jr. |
| 8,435,309 B2 | 5/2013 | Gilbert et al. |
| 8,452,447 B2 | 5/2013 | Nixon |
| 8,473,101 B2 | 6/2013 | Summer |
| 8,511,192 B2 | 8/2013 | Hirtt et al. |
| 8,516,918 B2 | 8/2013 | Jacobsen et al. |
| 8,529,582 B2 | 9/2013 | Devengenzo et al. |
| 8,534,728 B1 | 9/2013 | Bosscher et al. |
| 8,560,118 B2 | 10/2013 | Greer et al. |
| 8,640,723 B2 | 2/2014 | Jacobsen et al. |
| 8,667,643 B2 | 3/2014 | Simonelli et al. |
| 8,672,378 B2 | 3/2014 | Yamasaki et al. |
| 8,747,486 B2 | 6/2014 | Kawasaki et al. |
| 8,794,262 B2 | 8/2014 | Jacobsen et al. |
| 8,821,338 B2 | 9/2014 | Thorson |
| 8,849,457 B2 | 9/2014 | Jacobsen et al. |
| 8,870,967 B2 | 10/2014 | Herr et al. |
| 8,881,616 B2 | 11/2014 | Dize et al. |
| 8,888,864 B2 | 11/2014 | Iversen et al. |
| 8,892,258 B2 | 11/2014 | Jacobsen et al. |
| 8,920,517 B2 | 12/2014 | Smith et al. |
| 8,942,846 B2 | 1/2015 | Jacobsen et al. |
| 8,977,388 B2 | 3/2015 | Jacobsen et al. |
| 8,977,398 B2 | 3/2015 | Jacobsen et al. |
| 9,079,305 B2 | 7/2015 | Williamson et al. |
| 9,205,560 B1 | 12/2015 | Edsinger et al. |
| 9,295,604 B2 | 3/2016 | Zoss et al. |
| 9,314,921 B2 | 4/2016 | Jacobsen et al. |
| 9,329,587 B2 | 5/2016 | Fudaba et al. |
| 9,333,097 B2 | 5/2016 | Herr et al. |
| 9,346,165 B1 | 5/2016 | Metzger et al. |
| 9,446,510 B2 | 9/2016 | Vu et al. |
| 9,526,636 B2 | 12/2016 | Bedard et al. |
| 9,533,411 B2 | 1/2017 | Jacobsen et al. |
| 9,616,580 B2 | 4/2017 | Smith et al. |
| 9,618,937 B1 | 4/2017 | Blankespoor et al. |
| 9,643,323 B2 | 5/2017 | Nagatsuka et al. |
| 9,727,076 B2 | 8/2017 | Smith et al. |

(56) References Cited

U.S. PATENT DOCUMENTS

| | | |
|---|---|---|
| 9,789,603 B2 | 10/2017 | Jacobsen et al. |
| 9,862,090 B2 | 1/2018 | Kennedy et al. |
| 9,895,812 B2 | 2/2018 | Gonzalez et al. |
| 9,926,025 B1 | 3/2018 | Blankespoor et al. |
| 10,028,844 B2 | 7/2018 | Cheng et al. |
| 10,071,485 B2 | 9/2018 | Schiele et al. |
| 10,216,177 B2 | 2/2019 | Gildert et al. |
| 10,300,969 B1 | 5/2019 | Blackespoor et al. |
| 10,406,676 B2 | 9/2019 | Smith et al. |
| 10,512,583 B2 | 12/2019 | Smith |
| 10,518,404 B2 | 12/2019 | Barnes |
| 10,533,542 B2 | 1/2020 | Smith et al. |
| 10,561,564 B2 | 2/2020 | LaChappelle et al. |
| 10,566,914 B2 | 2/2020 | Fujita et al. |
| 10,609,896 B2 | 4/2020 | Kraaij et al. |
| 10,709,633 B2 | 7/2020 | Kazerooni et al. |
| 10,765,537 B2 | 9/2020 | Smith et al. |
| 10,828,767 B2 | 11/2020 | Smith et al. |
| 11,148,279 B1 | 10/2021 | Mooney et al. |
| 11,241,801 B2 | 2/2022 | Smith et al. |
| 11,697,497 B2 | 7/2023 | Smith et al. |
| 11,717,956 B1 | 8/2023 | Smith et al. |
| 11,738,452 B1 | 8/2023 | Smith et al. |
| 2001/0033146 A1 | 10/2001 | Kato et al. |
| 2001/0043847 A1 | 11/2001 | Kramer |
| 2002/0075233 A1 | 6/2002 | White et al. |
| 2002/0094919 A1 | 7/2002 | Rennex et al. |
| 2003/0005896 A1 | 1/2003 | Jacobsen et al. |
| 2003/0060808 A1 | 3/2003 | Wilk |
| 2003/0146720 A1 | 8/2003 | Riwan et al. |
| 2003/0152452 A1 | 8/2003 | Hodgson |
| 2003/0223844 A1 | 12/2003 | Schiele et al. |
| 2004/0004362 A1 | 1/2004 | Love |
| 2004/0037681 A1 | 2/2004 | Marcotte |
| 2004/0102723 A1 | 5/2004 | Horst |
| 2004/0106881 A1 | 6/2004 | McBean et al. |
| 2004/0116836 A1 | 6/2004 | Kawai et al. |
| 2004/0246769 A1 | 12/2004 | Ido |
| 2004/0250644 A1 | 12/2004 | Gosselin et al. |
| 2005/0059908 A1 | 3/2005 | Bogert |
| 2005/0099386 A1 | 5/2005 | Kukita |
| 2005/0159850 A1 | 7/2005 | Melman |
| 2005/0166413 A1 | 8/2005 | Crampton |
| 2005/0193451 A1 | 9/2005 | Quistgaard et al. |
| 2005/0251110 A1 | 11/2005 | Nixon |
| 2006/0052732 A1 | 3/2006 | Shimada et al. |
| 2006/0064047 A1 | 3/2006 | Shimada et al. |
| 2006/0069449 A1 | 3/2006 | Bisbee, III et al. |
| 2006/0130594 A1 | 6/2006 | Ikeuchi |
| 2006/0149419 A1 | 7/2006 | Ogawa et al. |
| 2006/0184275 A1 | 8/2006 | Hosokawa et al. |
| 2006/0197049 A1 | 9/2006 | Hamada et al. |
| 2006/0245897 A1 | 11/2006 | Hariki et al. |
| 2006/0249315 A1 | 11/2006 | Herr et al. |
| 2007/0054777 A1 | 3/2007 | Kawai et al. |
| 2007/0056592 A1 | 3/2007 | Angold et al. |
| 2007/0105070 A1 | 5/2007 | Trawick |
| 2007/0123997 A1 | 5/2007 | Herr et al. |
| 2007/0129653 A1 | 6/2007 | Sugar et al. |
| 2008/0009771 A1 | 1/2008 | Perry et al. |
| 2008/0023974 A1 | 1/2008 | Park et al. |
| 2008/0156363 A1 | 7/2008 | Ikeuchi et al. |
| 2008/0269027 A1 | 10/2008 | Chen |
| 2008/0271942 A1 | 11/2008 | Yamashita et al. |
| 2008/0281468 A1 | 11/2008 | Jacobsen et al. |
| 2009/0036815 A1 | 2/2009 | Ido |
| 2009/0038258 A1 | 2/2009 | Pivac et al. |
| 2009/0039579 A1 | 2/2009 | Clifford et al. |
| 2009/0149993 A1 | 6/2009 | Neki et al. |
| 2009/0199883 A1 | 8/2009 | Hiki |
| 2009/0210093 A1 | 8/2009 | Jacobsen et al. |
| 2009/0294238 A1 | 12/2009 | Gilmore |
| 2010/0050947 A1 | 3/2010 | Kortekaas |
| 2010/0089855 A1 | 4/2010 | Kjolseth |
| 2010/0094185 A1 | 4/2010 | Amundson et al. |
| 2010/0152630 A1 | 6/2010 | Matsuoka et al. |
| 2010/0198402 A1 | 8/2010 | Greer et al. |
| 2010/0234996 A1 | 9/2010 | Schreiber et al. |
| 2010/0241242 A1 | 9/2010 | Herr et al. |
| 2010/0295497 A1 | 11/2010 | Takamatsu |
| 2011/0010012 A1 | 1/2011 | Murayama et al. |
| 2011/0015786 A1 | 1/2011 | Kawai |
| 2011/0040216 A1 | 2/2011 | Herr et al. |
| 2011/0046781 A1 | 2/2011 | Summer |
| 2011/0066088 A1 | 3/2011 | Little et al. |
| 2011/0071677 A1 | 3/2011 | Stillman |
| 2011/0214524 A1 | 9/2011 | Jacobsen et al. |
| 2011/0219899 A1 | 9/2011 | Dize et al. |
| 2011/0264230 A1 | 10/2011 | Herr et al. |
| 2012/0000891 A1 | 1/2012 | Nakanishi et al. |
| 2012/0060322 A1 | 3/2012 | Simonelli et al. |
| 2012/0065902 A1 | 3/2012 | Nakajima |
| 2012/0073930 A1 | 3/2012 | Lansberry et al. |
| 2012/0137667 A1 | 6/2012 | Jacobsen et al. |
| 2012/0179075 A1 | 7/2012 | Perry et al. |
| 2012/0191245 A1 | 7/2012 | Fudaba et al. |
| 2012/0216671 A1 | 8/2012 | Gammon |
| 2012/0237319 A1 | 9/2012 | Jacobsen et al. |
| 2012/0259429 A1 | 10/2012 | Han et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |
| 2013/0023803 A1 | 1/2013 | Hsu et al. |
| 2013/0033050 A1 | 2/2013 | Matsuoka et al. |
| 2013/0057001 A1 | 3/2013 | Tsai |
| 2013/0090580 A1 | 4/2013 | Hong et al. |
| 2013/0106127 A1 | 5/2013 | Lipson et al. |
| 2013/0106128 A1 | 5/2013 | Yamasaki et al. |
| 2013/0192406 A1 | 8/2013 | Godowski |
| 2013/0226048 A1 | 8/2013 | Unluhisarcikili et al. |
| 2013/0253385 A1 | 9/2013 | Goffer et al. |
| 2013/0296746 A1 | 11/2013 | Herr et al. |
| 2013/0302129 A1 | 11/2013 | Smith et al. |
| 2013/0306430 A1 | 11/2013 | Laffranchi et al. |
| 2013/0331744 A1 | 12/2013 | Kamon |
| 2013/0333368 A1 | 12/2013 | Durfee et al. |
| 2014/0067124 A1 | 3/2014 | Williamson et al. |
| 2014/0088728 A1 | 3/2014 | Herr |
| 2014/0100492 A1 | 4/2014 | Nagasaka |
| 2014/0190289 A1 | 7/2014 | Zhu |
| 2014/0195052 A1 | 7/2014 | Tsusaka et al. |
| 2015/0073595 A1 | 3/2015 | Fudaba et al. |
| 2015/0073596 A1 | 3/2015 | Fudaba et al. |
| 2015/0173929 A1 | 6/2015 | Kazerooni et al. |
| 2015/0209214 A1 | 7/2015 | Herr et al. |
| 2015/0217457 A1 | 8/2015 | Lipson et al. |
| 2015/0272749 A1 | 10/2015 | Amend, Jr. et al. |
| 2015/0278263 A1 | 10/2015 | Bowles et al. |
| 2015/0289995 A1 | 10/2015 | Wilkinson et al. |
| 2015/0321340 A1 | 11/2015 | Smith |
| 2015/0321342 A1 | 11/2015 | Smith et al. |
| 2016/0003268 A1 | 1/2016 | Shevchenko et al. |
| 2016/0114482 A1 | 4/2016 | Lessing et al. |
| 2016/0153508 A1 | 6/2016 | Battlogg |
| 2016/0279788 A1 | 9/2016 | Kanaoka et al. |
| 2016/0279793 A1* | 9/2016 | Sisbot .................. B25J 9/1674 |
| 2016/0331556 A1 | 11/2016 | Wijesundara et al. |
| 2016/0331572 A1 | 11/2016 | Popovic et al. |
| 2016/0332302 A1 | 11/2016 | Bingham et al. |
| 2016/0332305 A1 | 11/2016 | Gonzalez et al. |
| 2016/0332312 A1 | 11/2016 | Song et al. |
| 2017/0050310 A1 | 2/2017 | Kanaoka |
| 2017/0119132 A1 | 5/2017 | Pruess et al. |
| 2017/0326737 A1 | 11/2017 | Martin et al. |
| 2018/0126548 A1 | 5/2018 | Sugito et al. |
| 2018/0133905 A1 | 5/2018 | Smith et al. |
| 2018/0133906 A1 | 5/2018 | Smith et al. |
| 2018/0193172 A1 | 7/2018 | Smith et al. |
| 2018/0193999 A1 | 7/2018 | Jacobsen et al. |
| 2018/0194000 A1 | 7/2018 | Smith et al. |
| 2018/0221237 A1 | 8/2018 | Swift et al. |

(56) References Cited

U.S. PATENT DOCUMENTS

| | | |
|---|---|---|
| 2018/0290309 A1 | 10/2018 | Becker et al. |
| 2018/0298976 A1 | 10/2018 | Battlogg |
| 2019/0022853 A1 | 1/2019 | Kim et al. |
| 2019/0105777 A1 | 4/2019 | Dalley et al. |
| 2019/0138423 A1 | 5/2019 | Agerstam et al. |
| 2019/0176320 A1 | 6/2019 | Smith et al. |
| 2019/0184576 A1 | 6/2019 | Smith et al. |
| 2020/0001450 A1 | 1/2020 | Smith et al. |
| 2020/0164523 A1 | 5/2020 | Hallock et al. |
| 2020/0281803 A1 | 9/2020 | Teng et al. |
| 2020/0312109 A1 | 10/2020 | Shionozaki |
| 2020/0346009 A1 | 11/2020 | Murray et al. |
| 2020/0368094 A1 | 11/2020 | Yoshimi et al. |
| 2020/0405417 A1 | 12/2020 | Shelton, IV et al. |
| 2021/0023693 A1 | 1/2021 | Berger et al. |
| 2021/0039269 A1 | 2/2021 | Son |
| 2021/0059780 A1 | 3/2021 | Sutherland et al. |
| 2021/0369536 A1 | 12/2021 | Mooney et al. |
| 2021/0378903 A1 | 12/2021 | Mooney et al. |
| 2023/0023083 A1 | 1/2023 | Shelton, IV et al. |
| 2023/0165649 A1* | 6/2023 | Fitzsimons ............ A61B 34/20 700/245 |

FOREIGN PATENT DOCUMENTS

| | | |
|---|---|---|
| CN | 101486191 B | 11/2012 |
| CN | 103610524 A | 3/2014 |
| CN | 203495949 U | 3/2014 |
| CN | 103802907 A | 5/2014 |
| CN | 203752160 U | 8/2014 |
| CN | 104843484 A | 8/2015 |
| CN | 105411813 A | 3/2016 |
| CN | 205250544 U | 5/2016 |
| CN | 105818143 A | 8/2016 |
| CN | 105856190 A | 8/2016 |
| CN | 107471203 A | 12/2017 |
| CN | 108081303 A | 5/2018 |
| CN | 111267992 A | 6/2020 |
| CN | 111616914 A | 9/2020 |
| DE | 102004029513 B3 | 9/2005 |
| DE | 102010029088 A1 | 11/2011 |
| DE | 202013009698 U1 | 11/2013 |
| DE | 102016201540 A1 | 8/2017 |
| DE | 202018104980 U1 | 10/2018 |
| EP | 0039578 A1 | 11/1981 |
| EP | 0616275 A3 | 9/1998 |
| EP | 1037264 A2 | 9/2000 |
| EP | 1258324 A2 | 11/2002 |
| EP | 1442846 A1 | 8/2004 |
| EP | 1721593 A1 | 11/2006 |
| EP | 2198810 A1 | 6/2010 |
| EP | 2548543 B1 | 1/2015 |
| EP | 2942162 A2 | 11/2015 |
| EP | 2168548 B1 | 10/2016 |
| FR | 2651220 A1 | 3/1991 |
| GB | 686237 A | 1/1953 |
| GB | 2278041 A | 11/1994 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-013252 A | 2/1977 |
| JP | S52-134985 A | 11/1977 |
| JP | H03-85398 U | 8/1981 |
| JP | S56-114688 A | 9/1981 |
| JP | S56-140510 A | 11/1981 |
| JP | S58-113586 A | 7/1983 |
| JP | S58-45724 B2 | 10/1983 |
| JP | S60-177883 U | 11/1985 |
| JP | S62-193784 A | 8/1987 |
| JP | S62-200600 A | 9/1987 |
| JP | H01-295772 A | 11/1989 |
| JP | H02-51083 U | 4/1990 |
| JP | H04-44296 U | 4/1992 |
| JP | H05-004177 A | 1/1993 |
| JP | H05-023989 A | 2/1993 |
| JP | H06-213266 A | 8/1994 |
| JP | H06-315879 A | 11/1994 |
| JP | H07-001366 A | 1/1995 |
| JP | H07-5129 Y2 | 2/1995 |
| JP | H07-060679 A | 3/1995 |
| JP | H07-112377 A | 5/1995 |
| JP | H07-031291 U | 6/1995 |
| JP | H07-246578 A | 9/1995 |
| JP | H08-126984 A | 5/1996 |
| JP | H09-11176 A | 1/1997 |
| JP | H09-190207 A | 7/1997 |
| JP | H1156931 | 3/1999 |
| JP | H11-130279 A | 5/1999 |
| JP | 2002-161547 A | 6/2002 |
| JP | 2003-089084 A | 3/2003 |
| JP | 2003-103480 A | 4/2003 |
| JP | 2003-146575 A | 5/2003 |
| JP | 2003-194104 A | 7/2003 |
| JP | 2004-041279 A | 2/2004 |
| JP | 2004-105261 A | 4/2004 |
| JP | 2004-195576 A | 7/2004 |
| JP | 2005-118938 A | 5/2005 |
| JP | 2005-237504 A | 9/2005 |
| JP | 2005-334999 A | 12/2005 |
| JP | 2006-007337 A | 1/2006 |
| JP | 2006-016916 A | 1/2006 |
| JP | 2006-028953 A | 2/2006 |
| JP | 2006-051558 A | 2/2006 |
| JP | 2006-167223 A | 6/2006 |
| JP | 3909770 B2 | 4/2007 |
| JP | 2007-130234 A | 5/2007 |
| JP | 2007-252514 A | 10/2007 |
| JP | 2007-307216 A | 11/2007 |
| JP | 2008-143449 A | 6/2008 |
| JP | 2009-023828 A | 2/2009 |
| JP | 2009-167673 A | 7/2009 |
| JP | 2009-178253 A | 8/2009 |
| JP | 2009-219650 A | 10/2009 |
| JP | 2009-240488 A | 10/2009 |
| JP | 2009-268839 A | 11/2009 |
| JP | 2010-098130 A | 4/2010 |
| JP | 2010-110381 A | 5/2010 |
| JP | 2010-110465 A | 5/2010 |
| JP | 2010-142351 A | 7/2010 |
| JP | 2010-263761 A | 11/2010 |
| JP | 2011-067941 A | 4/2011 |
| JP | 2011-073127 A | 4/2011 |
| JP | 2011-156171 A | 8/2011 |
| JP | 2011-193899 A | 10/2011 |
| JP | 2011-230260 A | 11/2011 |
| JP | 2012-501739 A | 1/2012 |
| JP | 2012-125279 A | 7/2012 |
| JP | 2012-176476 A | 9/2012 |
| JP | 2012-183291 A | 9/2012 |
| JP | 2013-022091 A | 2/2013 |
| JP | 2013-090693 A | 5/2013 |
| JP | 2013-123786 A | 6/2013 |
| JP | 2013-142445 A | 7/2013 |
| JP | 5267730 | 8/2013 |
| JP | 2013-176429 A | 9/2013 |
| JP | 2013-208293 A | 10/2013 |
| JP | 2013-220496 A | 10/2013 |
| JP | 2013-248699 A | 12/2013 |
| JP | 2014-054273 A | 3/2014 |
| JP | 2014-073199 A | 4/2014 |
| JP | 2014-073222 A | 4/2014 |
| JP | 2014-200853 A | 10/2014 |
| JP | 2015-112649 A | 6/2015 |
| JP | 2015-208814 A | 11/2015 |
| JP | 2015-212010 A | 11/2015 |
| JP | 2015-214019 A | 12/2015 |
| JP | 2016-539017 A | 12/2016 |
| JP | 2018-167375 A | 11/2018 |
| JP | 2020-037164 A | 3/2020 |
| JP | 6748374 B2 | 9/2020 |
| KR | 2005-0037754 A | 4/2005 |

(56) References Cited

FOREIGN PATENT DOCUMENTS

| KR | 2007-0057209 A | 6/2007 |
|---|---|---|
| KR | 2010-0112670 | 10/2010 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| KR | 2018-0128731 A | 12/2018 |
| KR | 2019-0108386 A | 9/2019 |
| SE | 515372 C2 | 7/2001 |
| WO | WO 94/29605 A1 | 12/1994 |
| WO | WO 2003/002309 A1 | 1/2003 |
| WO | WO 2003/081762 A1 | 10/2003 |
| WO | WO 2007/144629 A2 | 12/2007 |
| WO | WO 2009/040908 A1 | 4/2009 |
| WO | WO 2009/143377 A2 | 11/2009 |
| WO | WO 2010/025409 A1 | 3/2010 |
| WO | WO 2010/027968 A2 | 3/2010 |
| WO | WO 2012/042471 A1 | 4/2012 |
| WO | WO 2016/049622 A1 | 3/2016 |
| WO | WO 2017/148499 A1 | 9/2017 |
| WO | WO 2017/159504 A1 | 9/2017 |
| WO | WO 2018/118004 A1 | 6/2018 |
| WO | WO 2018/211869 A1 | 11/2018 |
| WO | WO 2018/215705 A1 | 11/2018 |
| WO | WO 2019/060791 A1 | 3/2019 |
| WO | WO 2020/175949 A1 | 9/2020 |

OTHER PUBLICATIONS

Albu-Schaffer et al., A Unified Passivity Based Control Framework for Position, Torque and Impedance Control of Flexible Joint Robots, Institute of Robotics and Mechatronics, 2007, vol. 26, 17 pages, Germany.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/tt10090605/.

Amikabir University of Technology, Manipulator Dynamics (Power Point), Computer Engineering and Information Technology Department, to the best of applicant's knowledge article was available before the application filing date, 44 pages.

Bao et al., A unified modeling and control design for precision transmission system with friction and backlash, Advances in Mechanical Engineering, 2016, vol. 8(5), 11 pages.

Barras, Stabilization of a Biped Robot with its arms—A Practical Approach, http://biorob.epfl.ch/files/content/sites/biorob/filed/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

David et al., Study of an External Passive Shock-absorbing Mechanism for Walking Robots, 8$^{th}$ IEEE International Conference on Humanoid Robots, Dec. 1-3, 2008, pp. 435-440, Institute of Electrical and Electronics Engineers, Piscataway, New Jersey.

Desai et al., Robust Swing Leg Placement under Leg Disturbances, 2012 IEEE International Conference on Robotics and Biomimetics, Dec. 11-14, 2012, pp. 265-270, China.

Digital World Tokyo, Giant Robot Grabbing Hands Grab All They Can, www.digitalworldtokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Filippeschi et al., Survey of Motion Tracking Methods on Inertial Sensors: A Focus on Upper Limb Human Motion, www.mdpi.com/journal/sensors, 2017, 40 pages, Sensors, Switzerland.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

Hunter et al., Fast Reversible NiTi Fibers For Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.

Industrial Magnetics, Inc., PowerLift® Magnets; www.magnetics.com/product.asp?ProductID=1; as accessed Nov. 6, 2012, 2 pages; Boyne City, Michigan.

Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.

Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.

Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.

Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.

Jacobsen, Science, Robotics, and Superheroes, Presented at Department of Science University of Utah Science at Breakfast, Mar. 17, 2010, 16 pages.

Jafari et al., A Novel Actuator with Adjustable Stiffness (AwAS), Oct. 18-22, 2010, 6 pages, IEEE/RSJ International Conference on Intelligent Robots and Systems, Taiwan.

Jansen et al., Exoskeleton for Soldier Enhancement Systems Feasibility Study, Sep. 2000, 44 pages, Oak Ridge National Laboratory, Oak Ridge, Tennessee.

Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.

Kazerooni, Berkeley Lower Extremity Exoskeleton (BLEEX), to the best of applicant's knowledge article was available before the application filing date, 3 pages, University of California, Berkeley, Berkeley, California.

Kim, Development of a small 6-axis force/moment sensor for robot's fingers, Measurement Science and Technology, Sep. 30, 2004, 2 pages, Issue 11, Institute of Physics and IOP Publishing Limited.

(56) References Cited

OTHER PUBLICATIONS

Kim et al, A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.
Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, Pennsylvania.
Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.
Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.
Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.
Magnetic Base, www.ask.com/wiki/magnetic_base; page last updated Sep. 12, 2012, 2 pages, retrieved from www.ask.com/wiki/magnetic_base.
Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.
Mirfakhrai et al., Polymer artificial muscles, materialstoday, Apr. 2007, pp. 30-38, vol. 10 No. 4, Elsevier, Netherlands.
Mombaur et al., HEiKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.
Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.
Newport Corporation, Heavy-Duty Magnetic Base, 300 lb (1334 N) Holding Force, ¼-20 Thread, http://search.newport.com/?q=*&x2=sku&q2=200, as accessed Apr. 23, 2011, 1 page, Irvine, CA.
Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.
Omega, Load Cell Designs, www.omega.com/literature/transactions/volume3/load3.html, Nov. 1, 2005, 3 pages.
Ostling, Wearable Robots, Technology Review, Jul./Aug. 2004, pp. 70-73, Elizabeth Bramson-Boudreau, Cambridge, Massachusetts.
Ott et al., Admittance Control using a Base Force/Torque Sensor, Department of Mechano-Informatics, 2009, 6 pages, University of Tokyo, Japan.
Pan, Improved Design of a Three-degree of Freedom Hip Exoskeleton Based on Biomimetic Parallel Structure, Jul. 2011, 132 pages, University of Ontario Institute of Technology, Canada.
Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.
Pelrine et al., High-field deformation of elastomeric dielectrics for actuators, Materials Science and Engineering, Nov. 28, 2000, pp. 89-100, vol. 11 Issue 2, Elsevier, Netherlands.
Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.
Pin, Wearable Robotics Presented to New Horizons in Science Briefing, Oct. 2003, 34 pages, Knoxville, Tennessee.
Pratt et al., The RoboKnee: An Exoskeleton for Enhancing Strength and Endurance During Walking, International Conference on Robotics & Automation, Apr. 2004, 6 pages, IEEE, New Orleans, LA.
Robotics Research Group, Degrees of Freedom, www.robotics.utexas.edu/rrg/learn_more/low_ed/dof/, Oct. 25, 2006, 2 pages, University of Texas.
Roetenberg et al., Xsens MVN: Full 6DOF Human Motion Tracking Using Miniature Inertial Sensors, XSENS—Inertial Motion Capture, Jan. 2009, 9 pages, XSENS Technologies.
Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.
Schuler et al., Dextrous Robot Arm, In Proceedings of the $8^{th}$ ESA Workshop on Advanced Space Technologies for Robotic and Automation 'ASTRA 2004' ESTEC, Nov. 2-4, 2004, 8 pages, Noordwijk, The Netherlands.
Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.
Seppala, These exoskeleton heels could help stroke victims walk again, https://www.engadpet.com/2015/04/02/feet-exoskeletons/, Apr. 2, 2015, Engadget, San Francisco, California.
Shamaei et al., Estimation of Quasi-Stiffness of the Human Knee in the Stance Phase of Walking, Mar. 22, 2013, 10 pages, vol. 8 Issue 3, PLOS One, San Francisco, California.
Siddharth et al., Design and Analysis of a 1-DOF Walking Mechanism, http://siddharthswaminathan.in/files/WalkingMechanism.pdf, Nov. 2012, 7 pages, India.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al, Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.
Suleiman, Engineering an affordable exoskeleton, Phys.org, https://phys.org/news/2014-06-exoskeleton.html, Jun. 12, 2014, 5 pages, Science X Network.
Szczesna et al., Inertial Motion Capture Costume Design Study, 2017, 21 pages, Sensors, Switzerland.
Tmsuk, Rescue Robot "T-53" release Control Technologies to Control the Synchronous Operation of the Arm, http://robot.watch.impress.co.jp/eda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.
Vanderborght et al., Variable impedance actuators: A review, Robotics and Autonomous Systems, Dec. 2013, 14 pages, vol. 61, Issue 12, Elsevier, Netherlands.
Walsh, Biomimetic Design of an Under-Actuated Leg Exoskeleton For Load-Carrying Augmentation, Massachusetts Institute of Technology, Feb. 2006, 97 pages, Massachusetts.
Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.

(56) References Cited

OTHER PUBLICATIONS

Yeates, Utah-built robot safeguards the workplace, http://www.ksl.com?nid=148&sid=17654421&autostart=y; Oct. 13, 2011, 3 pages, KSL Broadcasting, Salt Lake City, Utah.

Yip et al., High-Performance Robotic Muscles from Conductive Nylon Sewing Thread, 2015 IEEE International Conference on Robotics and Automation (ICRA), May 26-30, 2015, 6 pages, Seattle, Washington.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

\* cited by examiner

SYSTEMS AND METHODS FOR REDUNDANT NETWORK COMMUNICATION IN A ROBOT

BACKGROUND

Network redundancy is the process of adding additional instances of network devices and lines of communication to help ensure network availability and decrease the risk of failure along a critical data path. The underlying premise of network redundancy is to have a backup system in place in the event a point of failure in a network disrupts or bring downs the entire system. Redundancy in communication networks helps to mitigate single points of failure to ensure better network stability and uptime in the face of events that would otherwise take the system offline.

Network stability and redundancy in communication networks can be of importance in robotic contexts. Many robots and robotic systems possess complex and sophisticated on-board electronic and other hardware components (e.g., actuators, motors, sensors, switches, wiring, power-related components, controllers, computers, communication-related components, and others), many of which are configured to interface with one another and that are controlled via a computerized on-board network for the operation of the robot or robotic system. Disruption or failure of this network can be costly, and in some cases can create unsafe operating conditions. For example, in robots or robotic systems (e.g., wearable robotic exoskeletons donned by human beings, humanoid robots, teleoperated robots, unmanned ground robots, and others), network failures in conveying operation data signals to controllers, motors and actuators of the robot can leave the robot motionless or moving uncontrollably or operating beyond a range of movement. This is particularly problematic for those robots that interact with humans, or that comprise a human interface (e.g., human users donning an exoskeleton), or those robots that are operating in environments where a shut-down could cause damage. Network failures can result in operation of the robot that is not comfortable, or that results in damages costly to repair, or worse, that is dangerous or unsafe, for the human being interfacing with the robot. Network failures can, in other cases, result in problematic or dangerous operation, such as a robot interfacing with various classes of objects that require controlled handling at all times. Bomb disposal would be one example of this type of handling. To avoid unnecessary operational downtime, untimely and costly repairs, as well as potentially unsafe operating conditions for humans interfacing with certain types of robots or robotic systems, safeguards centered on network redundancy can help to ensure continued functionality, serviceability, and integrity of an on-board robot network during operation of the robot or robotic system.

DETAILED DESCRIPTION

Figure 1:
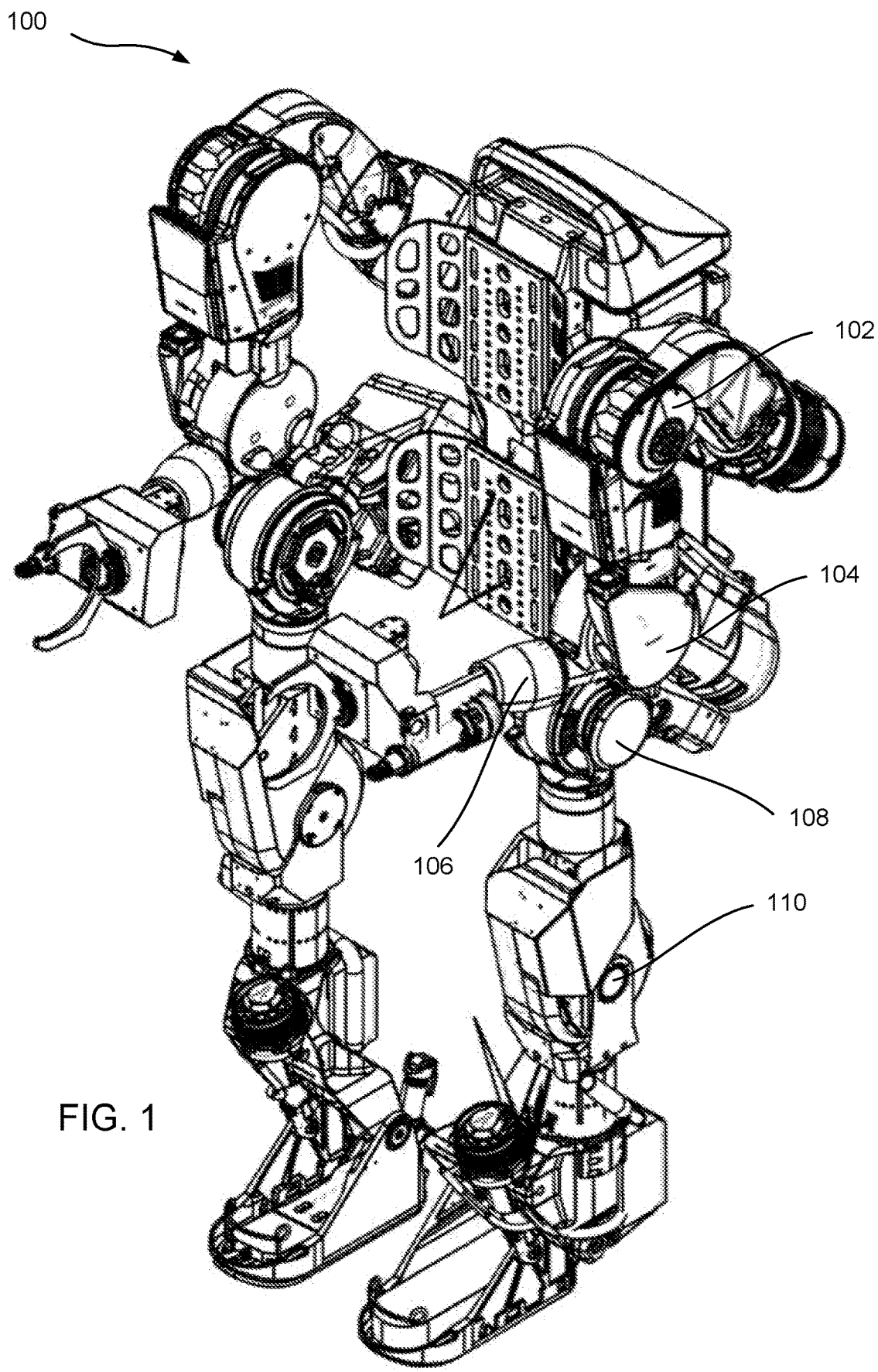
FIG. 1 is an isometric view of a robotic exoskeleton in accordance with an example of the present disclosure.

An initial overview of the technologies is provided below and then specific technology embodiments are described in further detail later. This initial summary is intended to aid readers in understanding the technologies more quickly but is not intended to identify key features or essential features of the technologies, nor is it intended to limit the scope of the claimed subject matter.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

Disclosed herein are examples of various configurations of the teachings contained herein. Although the disclosure may not expressly disclose that some examples or features described herein may be combined with other examples or features described herein, this disclosure should be read to describe any such combinations that would be practicable by one of ordinary skill in the art. Furthermore, the described features, structures, or characteristics may be combined in any suitable manner in one or more examples described herein.

Technologies are described herein for redundant network communication in a robot or robotic system (referred to herein generally as a robot). A robot can comprise a machine capable of performing a complex series of actions by way of commands or instructions transmitted over a communications network from a central or main robotic controller to one or more local controllers associated with one or more robotic components, wherein the main robotic controller, the local controller(s) and the robotic component(s) are part of the communications network. A robot control system can be used to control the movement of the robot, as well as to control other functioning devices of the robot. This can occur via commands or instructions from mechanical robotic components and program systems that make it possible to control the robot. The robotic components can be controlled in various ways using commands and data sent over the robot's communication network, including via a wired network (e.g. Ethernet or Ethercat network or fiber optics communication network), via a wireless network (e.g., Bluetooth, WiFi, free space optical, or other wireless means of communication), or via a mix of wired and wireless communication modalities. Each robotic component can comprise or otherwise be associated with its own local controller (e.g., component controller) and a controlled component for controlling a part of the robot. The local controller can control operation of the controlled component based on control data or instructions stored in the local controller and/or stored in and provided by the main robotic controller to the local controller to actuate an operation or perform a function of the controlled component. The local controller can execute the control instructions stored therein or provided by the main robotic controller to operate the controlled component. The controlled components can include, but are not limited to, actuators, motors, manipulators, end-effectors, and the like. For example, a robotic joint (e.g., robotic component) can include a local controller for controlling a controlled component in the form of a motor to effectuate rotation movement of the robotic joint.

A wide variety of robots or robotic systems exist, including, but not limited to, humanoid robots, exoskeleton robots, robotic arms, and other robots and robotic systems. One fundamental technical problem of robotics is system communication faults that occur due to breaks in communication channels, such as damage to a network cable or other physical connectivity issues, weak or noisy RF signal, RF interference, network congestion leading to packet loss, packet collision, or a failure of a network device. Indeed, network communication stability remains an inevitable challenge in the world of robotics. The technologies described herein address the technical problem of system communication faults in robotics by providing redundant communication channels between a main robotic controller and robotic components.

In one example configuration, a robot control system can comprise a redundant network communications system comprising two or more network channels used for communications between a main robotic controller and robotic components that have or that are otherwise associated with individual or local controllers that are operable to facilitate control of the controlled components (e.g., actuators, motors, manipulators, end-effectors, and the like) of each of the robotic components. One of the network channels can be designated as a primary network channel (e.g., first network channel) and the other network channel can be a redundant secondary network channel (e.g., second network channel). The local controllers and/or the main robotic controller can each be configured to monitor and individually diagnose communication errors on individual network channels of the first and second network channels to determine, on an individual basis, whether signals sent on either of the first and second network channels is degraded using self-diagnosis techniques described elsewhere herein. Alternatively or in addition to the self-diagnosis of individual network channels, the main robotic controller and local controllers of the robotic components can be configured to duplicate an original or originating data signal (e.g., a control signal) and to send/receive the duplicated data signal in parallel over the primary and secondary network channels, which are in network communication with the main robotic controller and the local controllers of the robotic components.

The first or primary network channel can be configured to facilitate network communication between the main robotic controller and a local controller of a robotic component to facilitate conveying a first data signal to/from the main robotic controller from/to the to the local controller for operating the local controller and/or the main robotic controller. The second or secondary network channel can be configured to facilitate network communication between the main robotic controller and the local controller to facilitate conveying a second data signal to/from the main robotic controller from/to the local controller for operating the local controller and/or the main robotic controller. The first data signal and the second data signal can be configured to be redundant data signals that are sent respectively over the first or primary network channel and the second or secondary network channel.

A local controller associated with a robotic component and/or the main robotic controller can be configured to implement various mechanisms to detect transmission errors and corrupted data on individual network channels (e.g. self-diagnostic or self-verification process, such as using checksum algorithms and processes), and/or to compare the data signals sent/received over the primary and secondary network channels to determine signal integrity and/or corruption of the data. In the case of a self-diagnostic, the local controller and/or main robotic controller can send/receive data and perform a checksum as an error detection mechanism and use various mechanisms such as using Error Correction Code or, when possible, retransmit a data packet. When a redundant communication channel is available other methods can be used to identify and recover from communication failure. For example, the local controller and/or main robotic controller can send/receive a first data signal sent over the primary network channel and a second data signal sent over the secondary network channel. In response to receiving the first and second data signals, the local controller of the robotic component and/or the main robotic controller can compare the signal integrity of the first data signal to the signal integrity of the second data signal to determine whether degradation or corruption of the first data signal has occurred. In the event that no degradation of the first data signal has occurred, the local controller and/or the main robotic controller can be configured to process the data signal to obtain a command encoded in the data signal. In the case of the local controller, the local controller can cause an associated controlled component of an associated robotic component perform the command obtained from the first data signal. However, in the event that degradation of the first data signal is detected, then the local controller of the robotic component can be configured to select the second data signal for processing and perform the command encoded in the second data signal.

In one example, the present disclosure sets forth a network communication system for a robot for providing redundant network communication to components in the robot. The system can include a main robotic controller in network communication with one or more robotic components. The system can further include a local controller in network communication with the main robotic controller and a controlled component of the one or more robotic components that is operable based on a data signal comprising control instructions executed by the local controller. The system can further include a first network channel configured to facilitate network communication between the main robotic controller and the local controller to facilitate conveying a first data signal between the main robotic controller and the local controller and a second network channel configured to facilitate network communication between the main robotic controller and the local controller to facilitate conveying a second data signal between the main robotic controller and the local controller. The first data signal and the second data signal can be configured to be redundant data signals sent respectively over the first network channel and the second network channel.

In another example of the present disclosure, the main robotic controller can include a power distribution module in electrical communication with the local controller of the robotic component via the second network channel. the main robotic controller can further include a data distribution module in network communication with the local controller of the robotic component via the first network channel and the second network channel. The second network channel can include a first connection that connects the data distribution module to the power distribution module, and a second connection that connects the power distribution module to the local controller.

In another example of the present disclosure, the second network channel can be configured to facilitate electrical communication between the power distribution module and the local controller to facilitate providing power to the local controller from the power distribution module through the second connection of the second network channel.

In another example of the present disclosure, the first connection of the second network channel can be configured to facilitate providing the second data signal from the data distribution module to the power distribution module to facilitate providing the second data signal over the second connection of the second network channel to the local controller in tandem with the power provided to the local controller over the second connection from the power distribution module.

In another example of the present disclosure, the first network channel can comprise one of a cable communication channel, a power-line communication channel, or a wireless communication channel. The second network channel can comprise one of a cable communication channel, a power-line communication channel, or a wireless communication channel. The wireless communication channel can comprise one or more of Wi-Fi, Bluetooth, electromagnetic wave transmission, or light transmission of signals.

In another example of the present disclosure, the second data signal being sent over the second network channel between the local controller and the main robotic controller can be encoded by one of the main robotic controller and the local controller. The encoded second data signal can be decoded by one of the main robotic controller and the local controller.

In another example of the present disclosure, the system can further comprise a power distribution module in electrical communication with the controlled component configured to operate the robotic component. The system can further comprise a main power line in electrical communication with the controlled component of the robotic component and the power distribution module to facilitate providing electrical power from the power distribution module to the controlled component.

In another example of the present disclosure, the controlled component can be in network communication with the local controller. The main power line can be configured act as a third network channel to facilitate network communication between the main robotic controller and the local controller through the power distribution module and the controlled component to facilitate providing a third data signal from the main robot controller over the third network channel to the local controller, in tandem with the power provided to the controlled component over the third network channel from the power distribution module, for operating the local controller.

In another example of the present disclosure, the third data signal being sent over the third network channel between the local controller and the main robotic controller can be encoded by one of the main robotic controller and the local controller, and the encoded third data signal can be decoded by one of the main robotic controller and the local controller.

In another example of the present disclosure, a wireless network channel can be configured to facilitate network communication between the main robotic controller and the local controller to facilitate conveying a wireless data signal between the local controller and the main robotic controller.

In another example of the present disclosure, the first data signal and the third data signal can be configured to be redundant data signals that are sent separately over the first network channel and the third network channel, respectively.

In another example of the present disclosure, the first data signal and the wireless data signal can be configured to be redundant data signals that are sent separately over the first network channel and the wireless network channel, respectively. The wireless data signal can comprise one or more of Wi-Fi, Bluetooth, electromagnetic wave transmission, or light transmission of signals.

In another example of the present disclosure, the system can further comprise a plurality of robotic components, each comprising a local controller in network communication with the main robotic controller. A first network channel can be provided for each local controller of the plurality of robotic components to facilitate network communication between the main robotic controller and each local controller to facilitate transferring the first data signal between the main robotic controller and each local controller of the plurality of robotic components. A second network channel can be provided for each local controller of the plurality of robotic components to facilitate network communication between the main robotic controller and each local controller to facilitate transferring the second data signal between the main robotic controller and the local controller for each local controller of the plurality of robotic components. The first data signal and the second data signal can be configured to be redundant data signals sent respectively over each first network channel and each second network channel between one or more local controllers of the plurality of robotic components and the main robotic controller.

In another example of the present disclosure, a local controller for controlling a controlled component of a robotic component in a robot is disclosed. The local controller can include a first network interface configured to facilitate network communication between a main robotic controller and the local controller over a first network channel to facilitate transferring a first data signal between the main robotic controller and the local controller and a second network interface configured to facilitate network communication between the main robotic controller and the local controller over a second network channel to facilitate transferring a second data signal between the main robotic controller and the local controller. The first data signal and the second data signal can be configured to be redundant data signals sent respectively to the first network interface and the second network interface.

In some examples of the local controller, the first network interface can be configured to facilitate network communication between a data distribution module of the main robotic controller and the local controller to facilitate transferring the first data signal between the local controller and the data distribution module.

In some examples of the local controller, the second network interface can be configured to facilitate electrical communication between a power distribution module of the main robotic controller and the local controller to facilitate transferring electric power for the local controller from the power distribution module.

In some examples of the local controller, the second network interface can be configured to facilitate network communication between the local controller and a data distribution module of the main robotic controller through the power distribution module to facilitate transferring the second data signal over the second network interface in tandem with the electric power for the local controller over the second network channel.

In some examples of the local controller, the first network interface can comprise one of a cable communication channel, a power-line communication channel, or a wireless communication channel, and the second network interface can comprise one of a cable communication channel, a power-line communication channel, or a wireless communication channel.

In some examples of the local controller, one or more of the wireless communication channels of the first network interface and the second network interface can comprise one or more of Wi-Fi, Bluetooth, electromagnetic wave transmission, or light transmission of signals.

In some examples, the local controller can be configured to receive an encoded second data signal to the second network interface and to decode the encoded second data signal received by the second network interface.

In some examples, the local controller can be configured to encode a second data signal and send the encoded second data signal over the second network interface to the main robotic controller.

In some examples, the local controller can further comprise a third network interface configured to facilitate network communication between the main robotic controller and the local controller over a third network channel to facilitate receiving a third data signal from a main robotic controller for operating the local controller. The third network interface can be configured facilitate network communication between an controlled component configured to operate the robotic component based on commands from the local controller, the controlled component being in network communication with the local controller and the main robotic controller. The third network interface can be configured to receive the third data signal from the main robotic controller via a third network channel between the controlled component and the local controller.

In some examples, the local controller can be configured to receive an encoded third data signal to the third network interface and to decode the encoded third data signal received by the third network interface.

In some examples, the local controller can be configured to encode a third data signal and send the encoded third data signal over the third network interface to the main robotic controller.

In some examples, the local controller can further comprise a wireless network interface configured to facilitate network communication between the main robotic controller and the local controller over a wireless network channel to facilitate transferring a wireless data signal between the local controller and the main robotic controller.

In some examples, the first data signal and the third data signal can be configured to be redundant data signals that are sent separately over the first network channel and the third network channel, respectively.

In some examples, the first data signal and the wireless data signal can be configured to be redundant data signals that are sent separately over the first network channel and the wireless network channel, respectively. The wireless data signal can comprise one or more of Wi-Fi, Bluetooth, electromagnetic wave transmission, or light transmission of signals.

In some examples, the local controller can further comprise a processor and a memory device including instructions that, when executed by the processor, cause the local controller to: (1) transfer first and second data signals between the main robotic controller and the local controller via the first and second network interfaces, wherein the first data signal is transferred via the first network interface, and the second data signal is transferred via the second network interface; (2) compare the first data signal with the second data signal to determine signal integrity of the first and second data signals; (3) determine degradation of the first data signal associated with the first network interface when the signal integrity of the first data signal is less than the signal integrity of the second data signal; and (4) select the second data signal received over the second network interface for processing when degradation of the first data signal is determined.

In some examples, the memory device can further include instructions that, when executed by the processor, cause the local controller to: (1) process the second data signal to obtain a command encoded in the second data signal; and (2) perform the command obtained from the second data signal.

In some examples, the instructions that, when executed by the processor, can cause the local controller to compare the first and second data signals to determine the signal integrity further: (1) compare signal to noise ratios of the first and second data signals; and (2) determine that a signal to noise ratio of the first data signal is less than a signal to noise ratio of the second data signal.

In some examples, the instructions that compare the first and second data signals to determine the signal integrity further cause the local controller to: (1) compare a number of data packets contained in each of the first and second data signals; and (2) determine that a number of data packets contained in the first data signal is less than a number of data packets contained in the second data signal.

In some examples, the memory device can further include instructions that, when executed by the at least one processor, cause the system to log signal integrity metrics for the first and second data signals to allow diagnosis of the degradation of the first data signal.

In some examples, the memory device further can include instructions that, when executed by the at least one processor, cause the system to generate a system notification to indicate a problem with the first network channel associated with the degradation of the first data signal.

In some examples, the main robotic controller and the local controller can transfer the first and second data signals in parallel over the first and second network channels.

In some examples, the memory device can further include instructions that, when executed by the at least one processor, cause the system to transfer a third data signal between the local controller and the main robotic controller over a third network channel in parallel with the first and second data signals. The third data signal can be compared to the first and second data signals to determine signal integrity degradation of any of the first, second, or third data signals.

In some examples, the memory device can further includes instructions that, when executed by the at least one processor, cause the system to transfer a wireless data signal sent over a wireless network channel in parallel with sending of the first and second data signals. The wireless data signal can be compared to the first and second data signals to determine signal integrity degradation of any of the first, second, or wireless data signals.

In some examples, the first, second, and third network channels can be any combination of cable communication channels, power-line communication channels, or wireless communication channels.

To further describe the present technologies, examples are now provided with reference to the figures. FIG. 1 illustrates a wearable robotic exoskeleton 100 in accordance with an example of the present disclosure, and in which the present technology can be implemented. Although a wearable robotic exoskeleton 100 is shown, principles of the present disclosure and the present technology can apply to any type of robot or robotic system including, but not limited to, humanoid robots, exoskeletons, robotic arms, robotic machinery, human-controlled robots, and other robots and robotic systems, or a combination thereof.

As shown, the robotic exoskeleton 100 can include a plurality of robotic components, systems and the like (e.g., local controllers and controlled components such as joints or mechanisms that actuate to produce movement or operate functions of the robotic exoskeleton 100) that facilitate movement of the robotic exoskeleton 100 in a plurality of degrees of freedom. For example, as shown, the robotic exoskeleton 100 can include one or more of a shoulder joint 102, an elbow joint 104, a wrist joint 106, a hip joint 108, and a knee joint 110, each of these facilitating movement of the robotic exoskeleton 100 in corresponding degrees of freedom. However, the present technology is not to be limited by the joints, robotic components, systems or the like illustrated in FIG. 1. Indeed, a robot can include one or more joints, robotic components, or systems, and one or more degrees of freedom of movement, that may or may not be analogous or kinematically equivalent to a human joint. As such, the disclosure is not intended to limit the number, location, or configuration of robotic components or systems or degrees of freedom of movement in any way. The robotic exoskeleton 100 can include a computerized network and a system for redundant network communication, as described in this disclosure.

Figure 2:
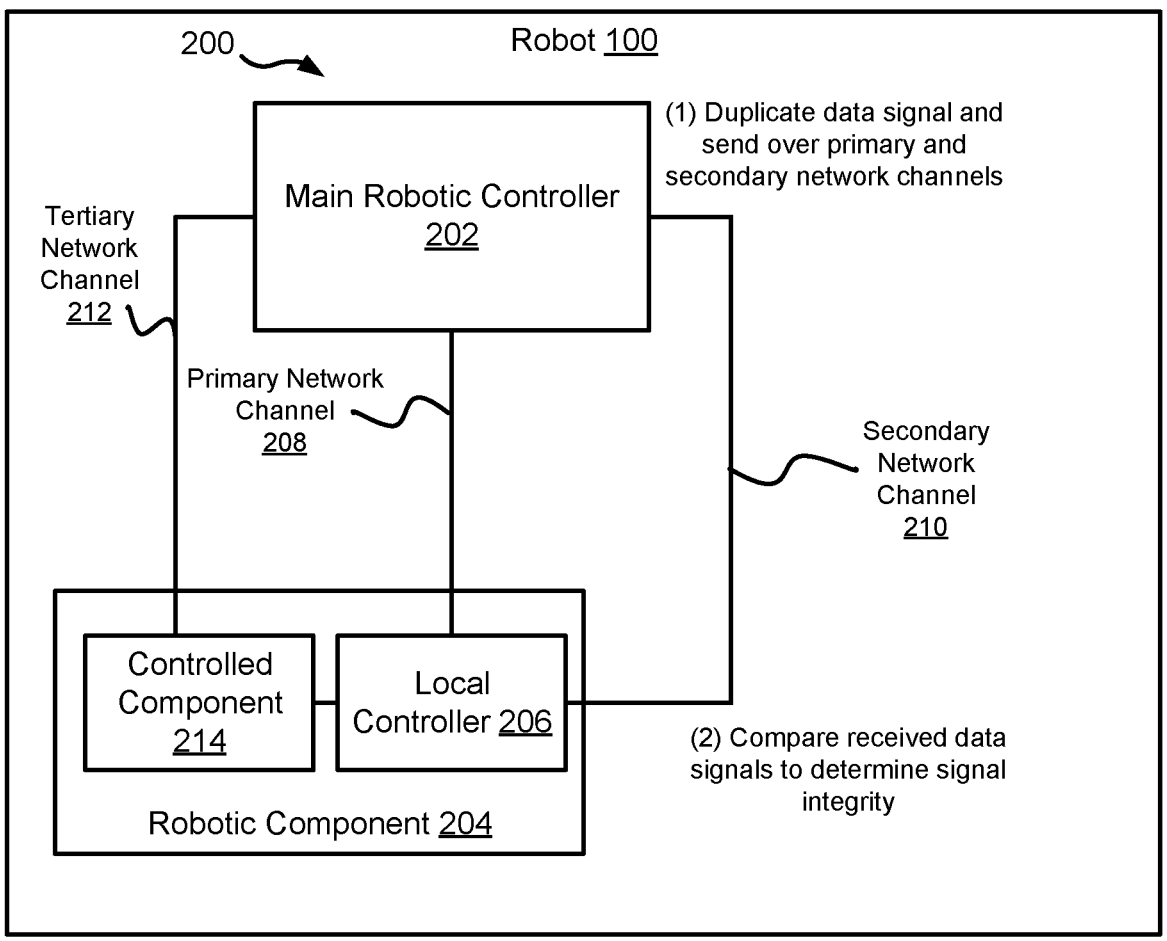
FIG. 2 is a diagram illustrating a high-level example of a system for redundant network communication in a robot in accordance with an example of the present disclosure.

FIG. 2 is a block diagram illustrating a high-level example of a system for redundant network communication (i.e., a redundant network communications system) in the robot or robotic system 100 (see, for example, the wearable exoskeleton robot 100 of FIG. 1). The redundant network communications system can be part of a robotic control system, and can comprise a main robotic controller 202 and one or more robotic components 204, where each robotic component 204 has or is otherwise associated with a controller 206 (i.e., a local controller). Each local controller 206 can comprise one or more processors and one or more associated memory or memory devices operable with the one or more processors. Each controller 206 can be in network communication with the main robotic controller 202 via a primary network channel 208 and a redundant secondary network channel 210, also of the redundant network communications system. The local controllers 206, as well as the main robotic controller 202 (and any local controllers and main robotic controllers described herein) are capable of bi-directional communication in that they can both send and receive data (e.g., local controllers can send/receive data to/from the main robotic controller and the main robotic controller can send/receive data to/from the local controllers). Although in certain places in the disclosure, it may be disclosed that the main robotic controller is sending data while the local controller is receiving data, it is to be understood by this disclosure that the main robotic controller can also receive data sent by the local controller.

Each robotic component 204 can further have or otherwise be associated with a controlled component 214. The controlled component 214 can be for driving motion and/or other functions of the robotic component 204. It is to be understood that the controlled component 214 can be any component used for performing or actuating a function or motion of a robot and is not intended to be limited in any way by this disclosure. Indeed, the controlled component (e.g., 214) of any robotic components in the robot 100 can be any functioning device of the robot 100 including, but not limited to, motors, gas or fluid or other actuators, clutches, transmissions, sensors, imaging devices, audio recording or playing devices, light emission devices, electrical filter circuits, sensors, or any other function or device of any kind within a robot that is driven or controlled by a controller. The controlled component 214 can be in network communication with the local controller 206 and the main robotic controller 202. The controlled component 214 can be in network communication with the main robotic controller 202 through a tertiary network channel 212.

The main robotic controller 202 manages commands and data to direct or regulate the movement and function of robotic components 204 included in the robot 100. The main robotic controller 202 sends commands and data to, and receives commands and data from, one or more local controllers 206 associated with one or more robotic components 204 using the primary network channel 208 and the redundant secondary network channel 210 for the purpose and function of facilitating the control and operation of the robotic components 204, as well as for other purposes. In other words, the commands and data from and to the main robotic controller 202 cause the robot, with its robotic components 204, to perform its various intended functions. More specifically, the main robotic controller 202 and the local controllers 206 (i.e., distributed controllers) each can be configured to send and/or receive data (including commands, sensor data, control parameters, and other key information) used to operate the robotic system, including controlling the robotic system and its various components, monitoring the robotic system health and any subsystems health, configuring the robotic system and its subsystems, and so forth. Indeed, directing the movement of the robot is only one of many functions that can be performed by the main controller 202 and the local or distributed controllers 206. Exchange of corruption free data between these signal conditioning, processing and control modules ensures proper and safe operation of the robot and its various systems or subsystems.

The network channels are communication channels. A communication channel refers to a physical transmission medium such as a wire, and software realized communication protocols or to a logical connection over a multiplexed medium, such as a radio channel in telecommunications and computer networking. A communication channel is used to convey an information signal (data signal), for example, a digital bit stream, from a sender (or transmitter) to one or more receivers. A communication channel has a certain capacity for transmitting information, often measured by the communication channel's bandwidth in Hertz (Hz) or a data rate in bits per second.

The primary and secondary network channels 208 and 210, respectively, can comprise a communication medium that provides a path for data transmission between the main robotic controller 202 and a local controller 206, such as the one associated with a robotic component 204. The term "associated with" is intended to cover all of the possible configurations or arrangements in which a local controller 206 is operable to receive/send commands and data from/to the main robotic component 102 for the purposes discussed herein and as understood by those skilled in the art, such as for controlling one or more robotic components, initiating or executing a function or operation of the robot, and/or for any other purpose related to the monitoring and/or operation of the robot. In one aspect, the local controller 206 being associated with a robotic component can mean that a local controller is part of (i.e., an integral component of) the robotic component 204. In another aspect, the local controller being associated with a robotic component can mean that the local controller is not necessarily part of the robotic component 204, but nonetheless in communication with the robotic component 204 for the intended purpose of receiving, sending and processing commands and data, such as to control the robotic component 204, or to perform another function or operation.

The medium of the primary and secondary network channels 208 and 210 can include: network cables (e.g., multiple twisted pair cables, coaxial cable, optical fiber cable, patch cable, power-line cable), wireless network components, free space optical network components, or another suitable medium, or any combination of these. The network channels can support the transfer of information in one direction, either direction alternately, or both directions simultaneously. These two modes of communication (either direction alternately or both direction simultaneously) can be referred to as half duplex and full duplex, respectively.

In the example illustrated in FIG. 2, the redundant network communications system of the robot 100 includes at least two network channels, such as the primary network channel 208 and the secondary network channel 210. In some cases, the redundant network communications system can comprise additional network channels, such as a tertiary network channel 212. The primary network channel 208 can be designated as the prime transmission channel for sending and receiving communications between the main robotic controller 202 and a local controller 206, such as one associated with a robotic component 204. The secondary network channel 210 can be a redundant communications channel used for sending and receiving the communications between the main robotic controller 202 and the local controller 206 associated with the robotic component 204.

In instances in which a self-diagnosed communication fault (e.g., a missed data packet) is detected by the local controller or main robotic controller over a network channel (e.g., primary network channel 208), the main robotic controller and/or local controller can then default to send/receive messages over a redundant network channel (e.g., secondary network channel 210 to ensure continued network communication and proper operation of the robot. Alternatively, a communication can be sent in parallel over both the primary network channel 208 and the secondary network channel 210 to ensure that, in the event of a communication fault in the primary network channel 208, the communication can be sent/received by the local controller 206 and/or the main robotic controller 202 via the secondary network channel 210.

Furthermore, the main robotic controller 202 or the local controller 206 can send, in parallel, identical data signals containing a command intended for a robotic component 204 over the primary and secondary network channels 208 and 210. As an example, the main robotic controller 202 or local controller 206 can duplicate a data signal (e.g., an original data signal) containing a command or instruction intended for a robotic component 204 or the main robotic controller 202 to form the first and second data signals, both containing the command or instruction. Thereafter, the main robotic controller 202 can send/receive, in parallel, the first data signal over the primary network channel 208 and the second data signal over the secondary network channel 210 to/from the local controller 206 associated with the robotic component 204. Accordingly, the same command or instruction can be sent/received over both the primary network channel 208 and the secondary network channel 210 by the main robotic controller 202 or the local controller 206 associated with the robotic component 204 at substantially the same time.

In one example configuration, an external source (e.g., a remote control or remote computer) can send commands to the main robotic controller 202, and the main robotic controller 202 can forward the commands to one or more intended local controllers associated with one or more robotic components 204 over both the first and second network channels 208 and 210. In another example configuration, the main robotic controller 202 can be an autonomous system within the robot 100, and the main robotic controller 202 can generate commands intended for one or more robotic components 204 and send the commands to the one or more local controllers over both the first and second network channels 208 and 210. Additionally, the local controllers 206 can likewise send commands to the main robotic controller 202 based on user input. For example, an external source (e.g., a remote control or remote computer) can send commands to the local controllers 206, and the local controllers 206 can forward the commands to the main robotic controller 202 over both the first and second network channels 208 and 210. In another example configuration, the local controllers 206 can autonomous systems within the robot 100, and can generate commands intended for the main robotic controller 202 and send the commands to the main robotic controller 202 over both the first and second network channels 208 and 210.

The tertiary network channel 212 can be provided to facilitate additional redundant network communication back and forth between the main robotic controller 202 and local controllers associated with the robotic component 204. Specifically, the tertiary network channel 212 can be provided to facilitate additional redundant network communication back and forth between the main robotic controller 202 and the controlled component 214. The tertiary network channel 212 can be a power line providing power to the controlled component 214. Additionally or alternatively, the tertiary network channel 212 can provide data communication back and forth between the main robotic controller 202 and the controlled component 214, thereby providing redundant communication and driving of the controlled component 214 in case the local controller 206 fails to provide control and data signals to the controlled component 214 for any reason, such as a failure of primary and secondary network channels 208 and 210.

Using redundant network channels for communication within the robot can lead to advantageous effects that avoid dangerous conditions and system failures. For example, instances in which a self-diagnosed communication fault (e.g., a missed data packet) is detected by the local controller or main robotic controller over a network channel (e.g., primary network channel 208), the main robotic controller or the local controller can then default to send messages over a redundant network channel (e.g., secondary network channel 210 to ensure continued network communication and proper operation of the robot even in the presence of a communication failure by one of the network channels. The self-diagnostic or self-verification features of the local controller used to individually diagnose signal integrity on the first and second network channels can be carried out using error detection algorithms and processes, such as using checksum, parity checks, cyclic redundancy checks.

Alternatively or in addition to the self-diagnostics described above, the local controller 206 or main robotic controller 202 can receive the first and second data signals sent over the primary and secondary network channels 208 and 210, and can compare the first data signal with the second data signal (namely the signal integrity of the first data signal can be compared with the signal integrity of the second data signal) to determine the signal integrity of the first data signal, which can be a health indicator of the primary network channel 208. For example, the signal integrity of the first data signal can be used to determine whether there is degradation in the first data signal that indicates a problem with the primary network channel 208.

Data signal degradation is a degradation or loss in quality, level, or standard of performance of a data signal. In other words, data signal degradation is a reduction or loss of "signal integrity" as used herein. Loss of signal integrity, or signal degradation, can be caused by a break in communication channels, such as damage to a network cable, network congestion, or other physical connectivity issues. Loss or reduction in signal integrity can be a weak or noisy RF signal, presence of RF interference, data packet loss, packet collision, or a failure of a network device. Degradation of a data signal can be identified when the signal integrity of one data signal is less than the signal integrity of the other data signal.

A loss in signal integrity can indicate that the first data signal sent over the primary network channel 208 has degraded during transfer between the main robotic controller 202 and the local controller 206 of the robotic component 204. Likewise, a degradation of the second data signal associated with the secondary network channel 210 can also be detected via comparison of the first and second data signals, in addition to using self-diagnostics, which can indicate that there can be a problem with the secondary network channel 210.

Accordingly, in response to receiving the first and second data signals, the local controller 206 of the robotic component 204 or the main robotic controller 202 can compare the data signals to determine the signal integrity of the data signals, data corruption, errors, a signal to noise ratio of the data signal that is lower than a desired value, as described in more detail below. In the case that the signal integrity of the first data signal, which is associated with the primary network channel 208, is less than the second data signal, which is associated with the secondary network channel 210, then the local controller 206 or main robotic controller 202 can determine that the first data signal is degraded.

Degradation usually refers to a reduction in quality of a digital signal, and can be caused by noise, interference, damage to a network cable, a failure of a network device, or other problems that can occur within the communications network of the robot 100.

In response to determining that the first data signal received over the primary network channel 208 is degraded, the local controller 206, as associated with the robotic component 204, or the main robotic controller 202 can ignore or discard the first data signal and select the second data signal received over the secondary network channel 210. The local controller 206 can process the second data signal to obtain a command or instruction intended for the robotic component 204 (e.g., controlled component 214 of the robotic component 204), and execute the command or instruction to cause the robotic component 204 (e.g., via the controlled component 214) to perform an action based on the command or instruction. That is, the local controller 206 of the robotic component 204 can failover to the secondary network channel 210 to receive commands and data to prevent a shutdown of the robot 100 due to network degradation or failure in the primary network channel 208 that results in a communication fault. Thus, network redundancy can be accomplished by monitoring the primary network channel 208 for communication faults and failing over to the secondary network channel 208 when signal degradation in the primary network channel 208 is detected, which can indicate a network failure in the primary network channel 208.

Figure 3:
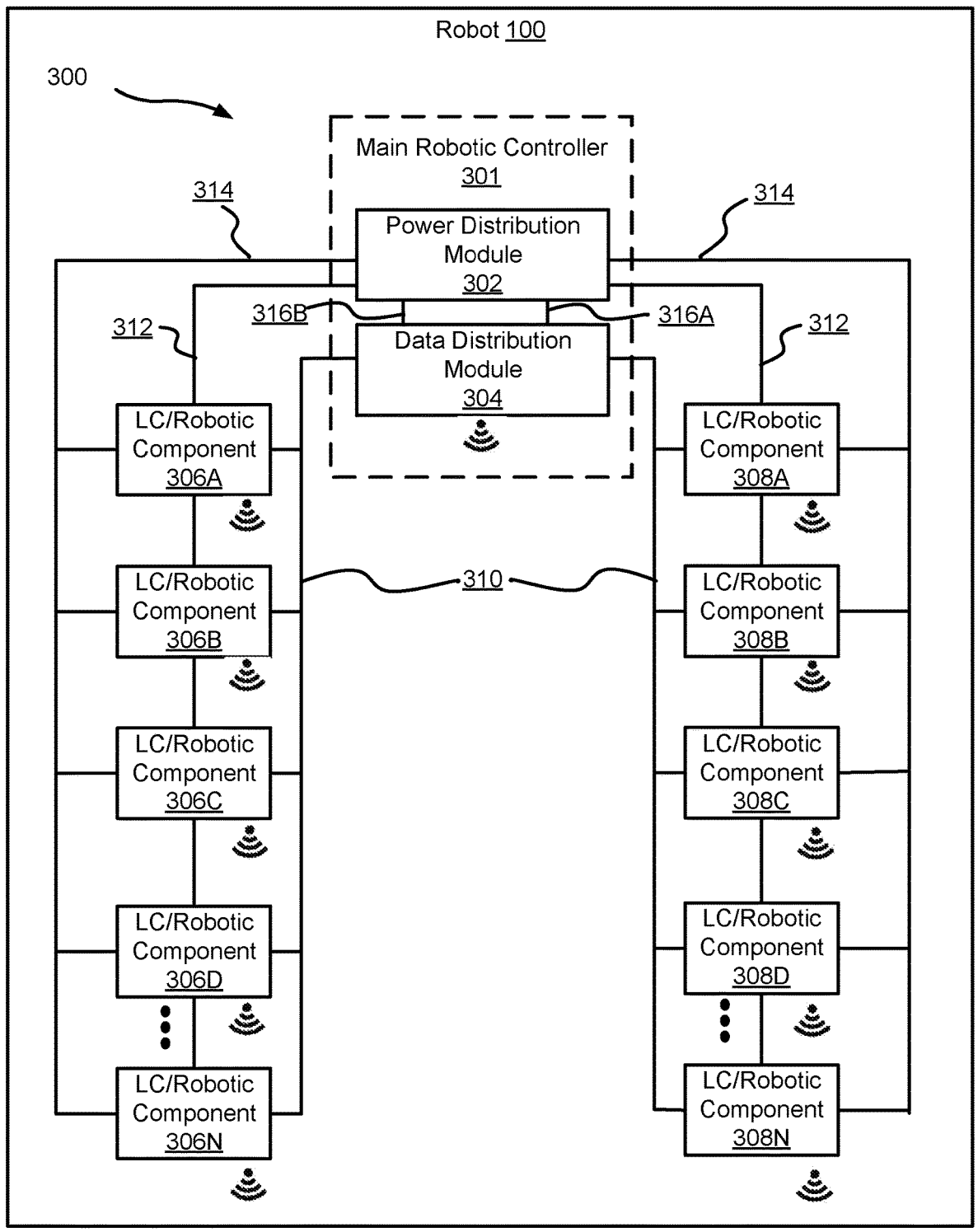
FIG. 3 is a diagram illustrating a system for redundant network communication in a robot in accordance with an example of the present disclosure.

FIG. 3 is a block diagram illustrating a high-level example of a redundant network communication system 300 within a robot, such as for example, robotic exoskeleton 100. System 300 can comprise a main robotic controller 301 in network communication with one or more local controllers, at least some of which can be associated with robotic components (e.g., see robotic components 306A-N and 308A-N, which are similar to the robotic component 204 of FIG. 2), or some of which can be operable to perform an intended function or operation other than controlling a device or system of the robot.

It is to be understood that, although the robotic components 306A-N and 308A-N do not specifically show local controllers and controlled components as shown in FIG. 2, each of the robotic components 306A-N and 308A-N can have or be associated with a local controller and a controlled component in network communication with the main robotic controller 301 (e.g., via network channels 310, 312, and 314) in a similar manner in which the local controller 206 and controlled component 214 are in network communication with the main robotic controller 202 (via network channels 208, 210, and 212) in FIG. 2. It is further to be understood that, elsewhere in this disclosure in which it is described that the main robotic controller 301 (including power distribution module 302 and/or data distribution module 304) provides data, power, and/or signals to each of the robotic components 306A-N and 308A-N that such data, power, and/or signals are provided to one or more of the local controller and the controlled component of the associated robotic component(s).

The main robotic controller 301 can provide power and data to the one or more robotic components 306A-N and 308A-N (e.g., the local controllers and/or the controlled components of the robotic components 306A-N and 308A-N) that operate various motions (e.g., degrees of freedom) and/or functions within the robot. The main robotic controller 301 can include a power distribution module 302 in electrical communication with the robotic components to facilitate providing electrical power to the robotic components (e.g., the local controllers and/or the controlled components of the robotic components 306A-N and 308A-N). The main robotic controller 301 can further include a data distribution module 304 to facilitate transferring control signals and other data between the robotic components (e.g., the local controllers and/or the controlled components of the robotic components 306A-N and 308A-N). Any number of robotic components can be used in a robot including right side robotic components 308A through 308N and left side robotic components 306A through 306N. The right side and left side robotic components 306A-308N can correspond to robotic components that facilitate degrees of freedom of movement (e.g., provided by joints) on the right and left side of the robot. However, those skilled in the art will recognize that these can also correspond to torso robotic components, or any robotic component regardless of placement, correspondence, function, and/or orientation.

As illustrated in FIG. 3, system 300 can include a primary network channel 310 (e.g., first network channel) configured to facilitate network communication between the main robotic controller 301 and the robotic component(s) 306A-308N. The primary network channel 310 can facilitate transfer of a first data signal between the main robotic controller 301 and the local controllers of the robotic components 306A-308N for operating the robotic components. As shown, the primary network channel 310 can deliver data signals from the data distribution module 304 to the robotic component(s) 306A-308N. The primary network channel, if wired, can comprise a single channel from the main robotic controller 301 that branches off to each robotic component or can comprise one separate channel for each robotic component from the main robotic controller 301. The medium of a network channel 310 can include: network cables (e.g., twisted pair cables, coaxial cable, optical fiber cable, patch cable, power-line cable, Ethernet cables), wireless network components, or another suitable medium. The network channels 310 may support the wired and/or wireless transfer of information in one direction, either direction alternately, or both directions simultaneously.

System 300 can include a secondary network channel 312 (e.g., second network channel) configured to facilitate network communication between the main robotic controller 301 and the local controllers of the robotic component(s) 306A-308N. The secondary network channel 312 can facilitate transfer of a second data signal between the main robotic controller 301 and the local controllers of robotic components 306A-308N for operating the robotic components. As shown, the secondary network channel 312 can deliver electrical power from the power distribution module 302 to the robotic component(s) 306A-308N. The secondary network channel 312 can comprise a single channel from the main robotic controller 301 that branches off to each robotic component or can comprise a separate channel for each robotic component from the main robotic controller 301. The medium of network channel 312 can include: network cables (e.g., twisted pair cables, coaxial cable, optical fiber cable, patch cable, power-line cable, Ethernet cables).

The secondary network channel 312 can be used to deliver both power and data between the main robotic controller 301 and the robotic components 306A-308N. As electric power needs to be delivered to local controllers and/or controlled components of the robotic components 306A-308N, the power lines between the main robotic controller 301 and the robotic component(s) 306A-308N can be utilized to also transfer data between the main robotic controller 301 and the robotic components 306A-308N. For example, the power distribution module 302 can be electrically connected to the data distribution module 304 via connection 316A to facilitate transfer of power from the power distribution module 302 to the data distribution module 304. Similarly, the data distribution module 304 can be electrically connected to the power distribution module 302 via connection 316B to facilitate transfer of data signals from the data distribution module 304 to the power distribution module 302. It will be understood by one of skill in the art that connections 316A and 316B can be combined into a single bi-directional power and communication pathway for conducting electric power and transferring data signals.

From the power distribution module 302, data signals can be tuned at a frequency, configured, and/or encoded to transmit over the secondary network channel 312 in tandem with the transmission of electric power without interfering with the data signals or the electric power transmission. The secondary network channel 312 can comprise one or more of connections 316A and 316B (e.g., a first connection) that connect the power distribution module 302 to the data distribution module 304 and can be used to deliver a data signal from the data distribution module 304 to the power distribution module 302. The secondary network channel 312 can further comprise secondary network channel 312 connections (e.g., second connections), which can connect the power distribution module 302 and robotic components 306A-308N. Accordingly, secondary network channel 312 can be utilized as a power-line communication channel to deliver power and data to one or more elements (e.g., local controller(s) and/or controlled component(s)) of the robotic component(s) 306A-308N.

Similarly, system 300 can include a tertiary network channel 314 that provides electric power from the power distribution module 302 to one or more additional elements (e.g., controlled components such as motors, actuators, imaging devices, audio devices, sensors, recording devices, or other) of the robotic component(s) 306A-308N and data between one or more local controllers and/or controlled components of the robotic component(s) and the main robotic controller 301. Similar to the secondary network channel 312, the tertiary network channel 314 can deliver electric power from the power distribution module 302 and data from the data distribution module 304, via connection 316B to the power distribution module 302, over the tertiary network channel 314 to the robotic component(s) 306A-308N. From the power distribution module 302, data signals can be tuned at a frequency, configured, and/or encoded to transmit over the tertiary network channel 314 in tandem with the transmission of electric power without interfering with the data signals or the electric power transmission. Accordingly, tertiary network channel 314 can be utilized as a power-line communication channel to deliver power and data to one or more elements (e.g., controlled component(s)) of the robotic component(s) 306A-308N.

Furthermore, each robotic component 306A-308N can comprise a wireless network component (e.g., wireless transmitter, receiver, or transceiver) for facilitating wireless network communication. The data distribution module 304 can also comprise a wireless network component (e.g., wireless transmitter, receiver, or transceiver) for facilitating wireless network communication between the robotic component(s) 306A-308N and the data distribution module. The wireless network components of the robotic component(s) and the data distribution module 304 can make up a wireless network channel for sending data signals between the robotic components and the data distribution module 304. Thus, the wireless network channel can comprise a fourth redundant communication channel for providing data signals to robotic component(s) from the data distribution module 304. The wireless network channel can comprise any wireless communication medium including, electromagnetic waves, light beams through mirrors and/or fiber optics, light transmission, Bluetooth, Wi-Fi, or other methods of wireless data transmission.

Figure 4:
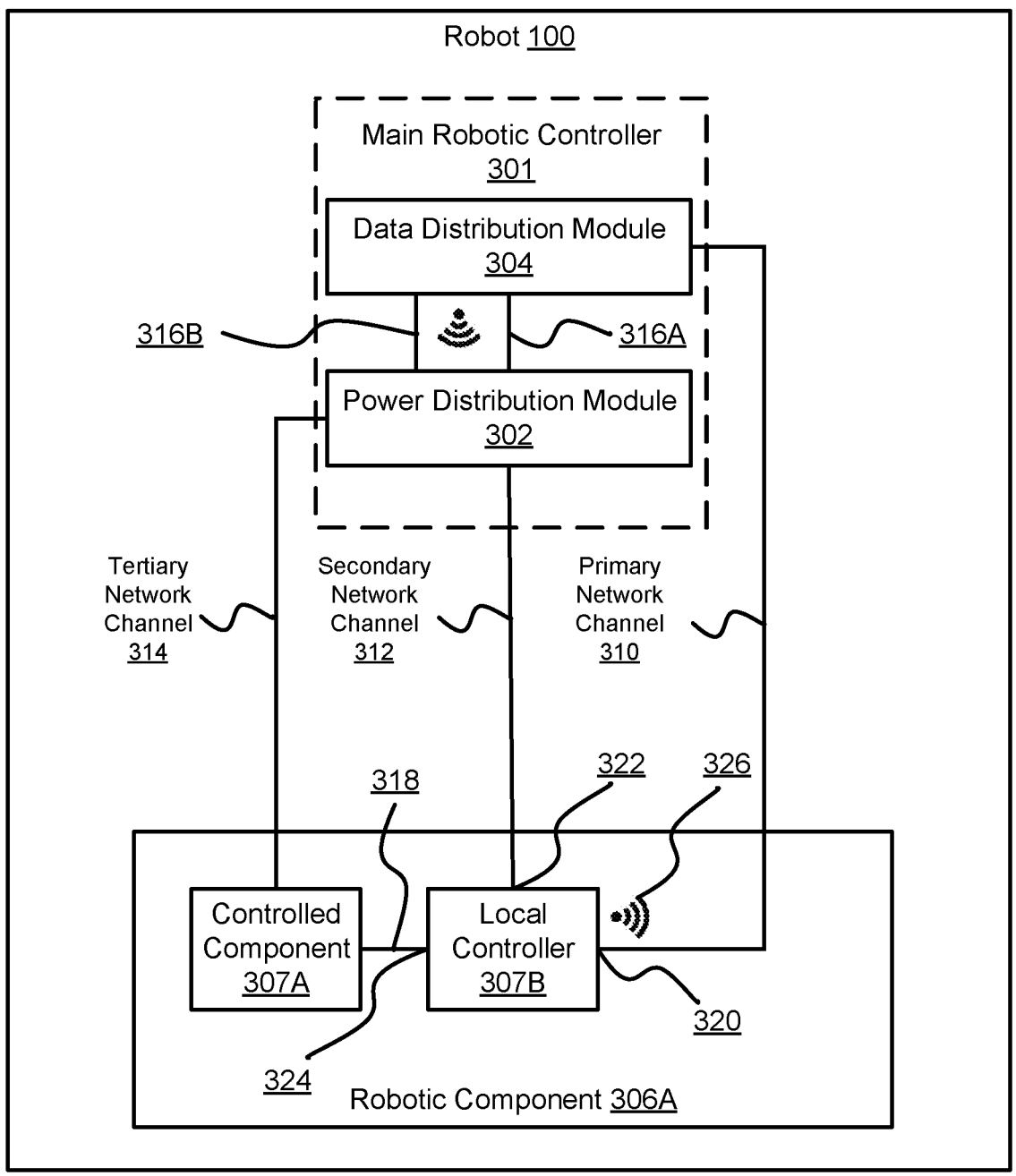
FIG. 4 is a diagram illustrating a robotic component in communication with the main robotic controller for redundant network communication system in a robot in accordance with an example of the present disclosure.

Each of the robotic components 306A through 308N of FIG. 3 can be configured to include a controlled component and a local controller. FIG. 4 illustrates a block diagram showing the interface of the main robotic controller 301 and the power and data distribution modules 302 and 304 with elements of one robotic component, namely robotic component 306A. As shown, the robotic component 306A can include a controlled component 307A for driving motion and/or function of the robotic component 306A. It is to be understood that the controlled component 307A can be any component used for actuating a function or motion of a robot and is not intended to be limited in any way by this disclosure. Indeed, the controlled component of any robotic components in the robot 100 can be any functioning device of the robot 100 including, but not limited to, motors, gas or fluid or other actuators, clutches, transmissions, sensors, imaging devices, audio recording or playing devices, light emission devices, or any other function or device of any kind within a robot that is driven or controlled by a controller. The controlled component 307A can receive signals containing commands for operation and actuation from a local controller 307B of the robotic component 306A.

As shown in FIG. 4, the primary network channel 310 can be configured to facilitate network communication between the main robotic controller 301 and the local controller 307B to facilitate transferring a first data signal between the main robotic controller 301 and the local controller 307B for controlling the local controller 307B or communicating with the main robotic controller 301. As described above, the primary network channel 310 can be any configuration of any wired and/or wireless data transfer network channel. The local controller 307B can include a first network interface 320 that connects, pairs, and/or interfaces with the primary network channel 310 to facilitate the network communication between the local controller 307B and the main robotic controller 301, and to facilitate the local controller 307B receiving the first data signal from the data distribution module 304 of the main robotic controller 301. The first network interface 320 can be any of one or more of a port for receiving an electrical connection, a connector, a plug, a wire, a wireless transmitter and/or receiver, or any element that facilitates any kind of network and/or electrical communication recited herein. The disclosure is not intended to limit the interface in anyway.

The secondary network channel 312 can be configured to facilitate network communication between the main robotic controller 301 and the local controller 307B to facilitate conveying a second data signal between the main robotic controller 301 and the local controller 307B for operating the local controller 307B or communicating with the main robotic controller 301. The local controller 307B can include a second network interface 322 that connects, pairs, and/or interfaces with the secondary network channel 312 to facilitate the network communication between the local controller 307B and the main robotic controller 301 and to facilitate receiving the second data signal by the local controller 307B in tandem with the electric power for the local controller 307B from the power distribution module 302 of the main robotic controller 301. The second network interface 322 can be any of one or more of a port for receiving an electrical connection, a connector, a plug, a wire, a wireless transmitter and/or receiver, or any element that facilitates any kind of network and/or electrical communication recited herein. The disclosure is not intended to limit the interface in anyway.

The power distribution module 302 can provide electrical power to the local controller 307B of the robotic component 306A. Additionally, as shown, the data distribution module 304 can be electrically connected to the power distribution module 302 so that the data distribution module 304 can be provided with electrical power. Additionally, the secondary network channel 312 can be configured to provide electrical communication from the power distribution module 302 to the local controller 307B to facilitate providing power to the local controller 307B from the power distribution module 302.

The secondary network channel 312 can be in network communication with both the main robotic controller 301 and the local controller 307B through the power distribution module 302 to facilitate transferring the second data signal from the main robot controller 301 over the secondary network channel 312 in tandem with the power provided to the local controller 307B over the second network channel 312 from the power distribution module 302. The secondary network channel 312 can comprise one or more of connections 316A and 316B (e.g., a first connection) that connects the power distribution module to the data distribution module. The secondary network channel 312 can further comprise the secondary network channel 312 connection (e.g., second connection) that can connect the power distribution module 302 and local controller 307B.

The connection 316A (e.g., first connection) between the data distribution module 304 and the power distribution module 302 can serve to provide the second data signal from the data distribution module 304 to the power distribution module 302. The secondary network channel 312 (e.g., second connection) can be configured to provide electrical communication from the power distribution module 302 to the local controller 307B to facilitate providing power to the local controller 307B from the power distribution module 302. The second data signal can be configured, tuned, and/or encoded by the local controller, the main robotic controller 301, data distribution module 304, or power distribution module 302 to travel along the secondary network channel 312 in tandem with electrical power in order to transfer redundant data signals between the local controller 307B and the main robotic controller 301 without interfering with either the electrical power or the data signals. The local controller 307B can include a decoder for decoding encoded second data signals sent over the secondary network channel 312 to the local controller 307B. Similarly, the main robotic controller 301 can include a decoder for decoding encoded second data signals sent over the secondary network channel 312 to the main robotic controller 301. The first data signal and the second data signal are configured to be redundant data signals that are sent respectively over the primary network channel 310 and the secondary network channel 312. Accordingly, the secondary network channel 312 can be utilized as a power-line communication channel to deliver power and data to one or more elements (e.g., local controller(s)) of the robotic component(s) or the main robotic controller 301. From the power distribution module 302, data signals can be tuned at a frequency, configured, and/or encoded to transmit over the secondary network channel 312 in tandem with the transmission of electric power without interfering with the data signals or the electric power transmission.

As shown, the tertiary network channel 314 can provide electrical power from power distribution module 302 to the controlled component 307A. The tertiary network channel 314 (e.g., main power line) can further be configured to facilitate network communication between the main robotic controller 301 and the local controller 307B to facilitate transferring a third data signal between the main robotic controller 301 and the local controller 307B for operating the local controller 307B or the main robotic controller 301. The local controller 307B can include a third network interface 324 that connects, pairs, and/or interfaces with the third network channel 314 to facilitate the network communication between the local controller 307B and the main robotic controller 301 and to facilitate receiving electrical power by the local controller 307B and transferring the third data signal between the local controller 307B and the main robotic controller 301. The electrical power can be received by the third network interface 324 from the power distribution module 302 of the main robotic controller 301, through the connection 318 and controlled component 307A, thus providing a redundant electrical power channel in addition to the redundant network communication channels for delivering redundant data signals. Furthermore, the third data signal can be received by the third network interface 324 from the data distribution module 304 of the main robotic controller 301 through the power distribution module 302, the controlled component 307A, and the connection 318. The third network interface 324 can be any of one or more of a port for receiving an electrical connection, a connector, a plug, a wire, a wireless transmitter and/or receiver, or any element that facilitates any kind of network and/or electrical communication recited herein for transferring data and/or electrical power. The disclosure is not intended to limit the interface in anyway.

The power distribution module 302 can provide electrical power to the controlled component 307A of the robotic component 306A. The controlled component 307A can be in network communication with the local controller 307B through connection 318. Accordingly, the third data signal can be provided to/from the local controller 307B from/to the data distribution module 304 via the power distribution module 302, the controlled component 307A, and connection 318 to facilitate transferring a third data signal between the main robotic controller 301 and the local controller 307B over the third network channel 314 in tandem with the power provided to the controlled component 307A over the third network channel 314 from the power distribution module 304.

Similar to the second data signal, the third data signal sent over the tertiary network channel 314 can be configured, tuned, and/or encoded by the main robotic controller 301, data distribution module 304, or power distribution module 302 to travel along the tertiary network channel 314 in tandem with electrical power in order to deliver redundant data signals to the local controller 307B without interfering with either the electrical power or the data signals. The local controller 307B can include a decoder for decoding encoded second data signals sent over the secondary network channel 312 to the local controller 307B. Similarly, the main robotic controller 301 can include a decoder for decoding encoded second data signals sent over the secondary network channel 312 to the main robotic controller 301. The first, second, and third data signals can be configured to be redundant data signals sent respectively over the first network channel, the second network channel, and the third network channel.

As disclosed, the robot, in addition to the primary, secondary, and tertiary network channels, can further include an additional wireless network channel facilitating network communication between the main robotic controller 301 and the local controller 307B to facilitate transferring a wireless data signal between the data distribution module 302 of the main robotic controller 301 and the local controller 307B. The local controller 307B can include a wireless network interface 324 that connects, pairs, and/or interfaces with the wireless network channel to facilitate the network communication between the local controller 307B and the main robotic controller 301 and to facilitate the local controller 307B receiving/sending the wireless data signal from/to the data distribution module 304 of the main robotic controller 301. The first network interface 320 can be any known wireless transmitter and/or receiver, or any element that facilitates any kind of wireless network and/or electrical communication recited herein, including wireless communication mediums, electromagnetic waves, light beams through fiber optics or mirrors, light transmission, Bluetooth, Wi-Fi, or other methods of wireless data transmission. The disclosure is not intended to limit the interface in anyway. The first, second, third, and wireless data signals can be configured to be redundant data signals for the local controller or main robotic controller that are sent separately over the primary, secondary, and tertiary network channels and the wireless network channel, respectively.

While FIG. 4 shows a single robotic component including a local controller and controlled component, it is to be understood that the system can include a plurality of robotic components, each comprising a local controller in network communication with the main robotic controller and each comprising a controlled component driven by the local controller. A first network channel can be provided for each local controller of the plurality of robotic components to facilitate network communication between the main robotic controller and each local controller and to facilitate transferring the first data signal between the main robotic controller and the local controller for operating each local controller or the main robotic controller. A second network channel can be provided for each local controller of the plurality of robotic components to facilitate network communication between the main robotic controller and each local controller to facilitate transferring a second data signal between the main robotic controller and the local controller for operating each local controller or the main robotic controller. The first data signal and the second data signal can be configured to be redundant data signals for the local controller sent respectively over each first network channel and each second network channel to each local controller of the plurality of robotic components. Each robotic component 306A-306N and 308A-308N, and any number of other robotic components of the robot 100, can be configured as the robotic component 306A as shown in FIG. 4.

A network system within a robot as described above can have many different configurations and may be implemented in various ways and examples. FIGS. 5-7 provide various examples of network channel configurations of example redundant network communications systems that can be used for redundant network communication in a robot (e.g., the robot 100 in FIGS. 1-4, or any other robot or robotic system). The various example network channel configurations shown in FIGS. 5-7 are based on the general network channel configuration of the redundant network communications system of the robot 100 shown in FIGS. 1-4, and discussed above. In other words, any of the more specific example network channel configurations shown in FIGS. 5-7, and discussed below, can function in a similar manner as the general network channel configuration discussed above, and can be incorporated into a robot, such as the robot 100 of FIGS. 1-4. As such, the above discussion relating to FIGS. 1-4 can be referred to as needed for an understanding of the various example network channel configurations of FIGS. 5-7. Moreover, for the sake of simplicity, the local controllers are not shown in FIGS. 5-7, but it is nonetheless understood that the main robotic controller 502 is operable to exchange communications with the robotic components 508A-N through one or more local controllers associated with the one or more robotic components 508A-N. As such, even if not specifically stated, any reference herein to communication between the main robotic controller 502 and any of the robotic components 508A-N should be understood to mean that the communication is via a local controller and/or a controlled component associated with the robotic components 508A-N, as described above.

Furthermore, it is to be understood that, although the robotic components 508A-N do not specifically show local controllers and controlled components as shown in FIG. 2, each of the robotic components 508A-N can have or be associated with a local controller and a controlled component in network communication (e.g., via power line comms channel 512 and/or cable comms channel 514A) with the main robotic controller 502, power distribution module 504, and/or data distribution module 506) in a similar manner in which the local controller 206 and controlled component 214 are in network communication (via network channels 208, 210, and 212) with the main robotic controller 202 (including power distribution module and/or data distribution module) in FIG. 2. It is further to be understood that, elsewhere in this disclosure in which it is described that the power distribution module 504 and/or data distribution module 506 provides data, power, and/or signals to each of the robotic components 508A-N and that such data, power, and/or signals are provided to one or more of the local controller and the controlled component of the associated robotic component(s).

FIG. 5 is a block diagram illustrating an example network configuration for a robot 510A. The network configuration can comprise primary and secondary network channels in the form of a cable communication channel 514A and a power-line communication channel 512 (collectively referred to as network channels 512, 514A). The power-line communication channel 512 and the cable communication channel 514A can be part of a local area network (LAN) used for communications between a main robotic controller 502 and the local controllers and/or controlled components, such as those associated with the robotic components 508A-N contained in the robot 510A. The LAN can be configured to use one or more Ethernet communications protocols or other appropriate communications protocols.

As shown, the robot 510A can include the main robotic controller 502, a data distribution module 506, a power distribution module 504, and a plurality of robotic components 508A-N (e.g., actuators, motors, manipulators, end-effectors, and the like). Each robotic component 508A-N can be associated with a local controller and/or a controlled component (e.g., in the same or similar manner as the local controller 206 and controlled component 214 described above in association with FIG. 2). In another example, some of the local controllers in a series of local controllers can exist that are configured to perform other operations associated with the robot rather than being associated with one of the robotic components 508 A-N. Each robotic component 508A-N, local controller, and/or controlled component can be assigned a network address that uniquely identifies it as a node included in the LAN.

In one example, the cable communication channel 514A can serve as the primary network channel for the robot 510A, and the power-line communication channel 512 can serve as the redundant or backup (i.e., secondary) network channel for the robot 510A. It will be appreciated, however, that in some examples the power-line communication channel 512 can serve as the primary network channel and the cable communication channel 514A can serve as the secondary network channel. A physical transmission medium used for the cable communication channel 514A can include, but is not limited to, multi-twisted pair cables (e.g., Ethernet cable), optical fiber cable, and/or coaxial cable. A physical transmission medium used for the power-line communication channel 512 can include one or more alternating current (AC) power wires or direct current (DC) that supply electrical power to the robotic components 508A-N including the local controllers contained in the robot 510A. The power-line communication channel 512 can facilitate power-line communication (also known as power-line carrier or PLC), which can carry data on a conductor that is also used simultaneously for AC or DC electric power transmission or electric power distribution to the electric components of the robot 510A. The power-line communications channel 512 can operate by adding a modulated carrier signal to the wiring system of the robot 510A.

As illustrated, the main robotic controller 502 for the robot 510A can be in network communication with a data distribution module 506 configured to facilitate network communications between the main robotic controller 502 and the robotic components 508A-N (via a local controller and/or controlled component associated with the robotic components 508A-N), as well as between the main robotic controller 502 and any other local controllers. In response to receiving a communication from the main robotic controller 502, the data distribution module 506 may encode the communication into duplicate data signals and send one of the data signals over the cable communications channel 514A and send the other data signal to a power distribution module 504 configured to send the data signal over the power-line communication channel 512. In one example, the data distribution module 206 may encrypt the duplicate data signals before distributing the data signals to the robotic components 508A-N. Accordingly, an identical communication is transferred in parallel between at least one of the local controllers, such as those associated with the robotic components 508A-N, and the main robotic controller 502 over both the cable communication channel 514A and the power-line communication channel 512.

In response to receiving the data signals sent over the network channels 512 and 514A, a robotic component 508A-N, local controller (e.g., local controller 307B), such as one associated with one of the robotic components 508A-N, compares the data signals to determine the signal integrity of the data signals. In a similar way, the main robotic controller 202 can receive data sent over network channels 212 and 214 from the local controllers associated with robotic components 208A-N and compare the data signals to determine the signal integrity of the data signals. As described earlier in association with FIG. 2, in one example, the local controller or main robotic controller can determine signal integrity by comparing signal strengths and signal to noise ratios of the data signals to determine whether a signal strength and signal to noise ratio of the data signal sent over the cable communications channel 514A is less than the signal strength and signal to noise ratio of the data signal sent over the power-line communications channel 512. In another example, the local controller, such as one associated with one of the robotic components 508A-N, or the main robotic controller can determine signal integrity by comparing a number of data packets contained in each of the data signals to determine whether a number of data packets contained in the data signal sent over the cable communications channel 514A is less than a number of data packets contained in the data signal sent over the power-line communications channel 512. In the case that the local controller or main robotic controller can determine that the signal integrity of the data signal sent over the cable communications channel 514A is degraded, the local controller or main robotic controller can ignore or discard that data signal and instead process the data signal received over the power-line communications channel 512. For example, the local controller or main robotic controller can process the data signal sent over the power-line communications channel 512 to obtain a command encoded in the data signal and perform the command obtained from the data signal.

Alternatively, or in addition to the comparison of data signals sent over network channels 212 and 214, the local controllers of robotic components 508A-N and/or the main robotic controller 502 can individual monitor and self diagnose communication statuses of the network channels 212 and 214 without comparing the redundant data signals sent over the network channels 212 and 214.

Figure 5A:
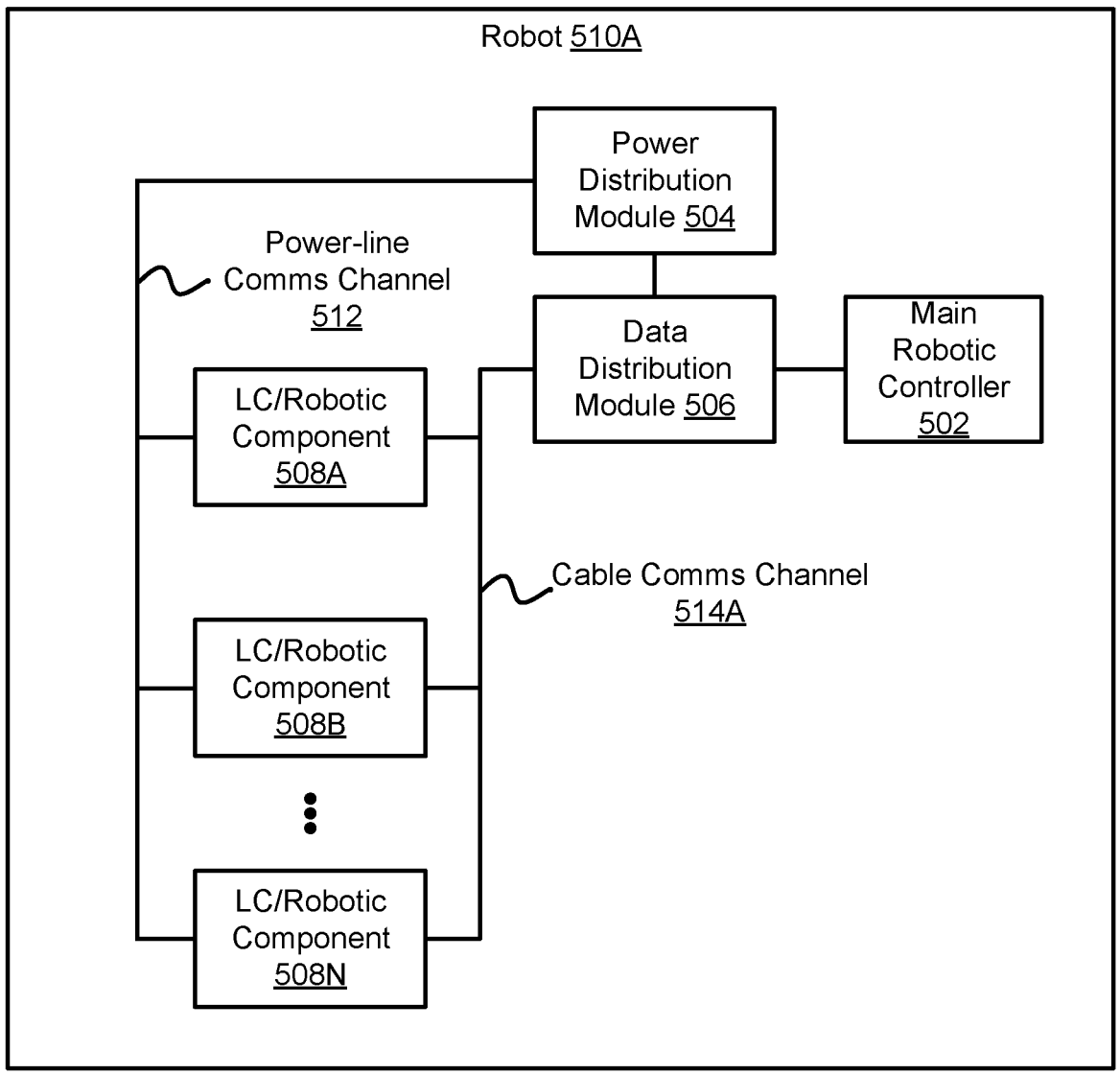
FIGS. 5A-7B illustrate various examples of network configurations of example redundant network communication systems, which can be used to implement redundant network communication in a robot in accordance with examples of the present disclosure.
Figure 5B:
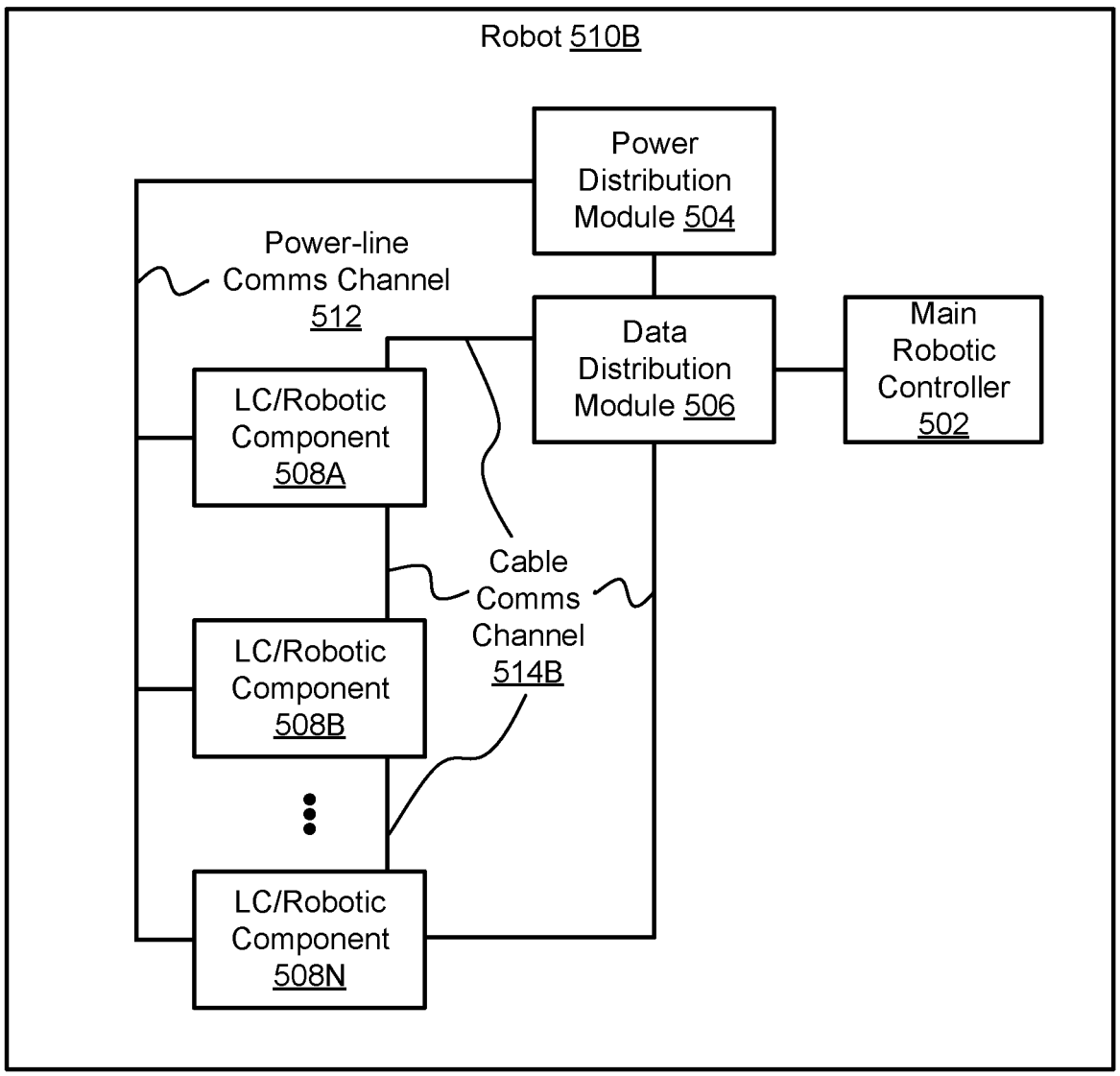
Figure 6:
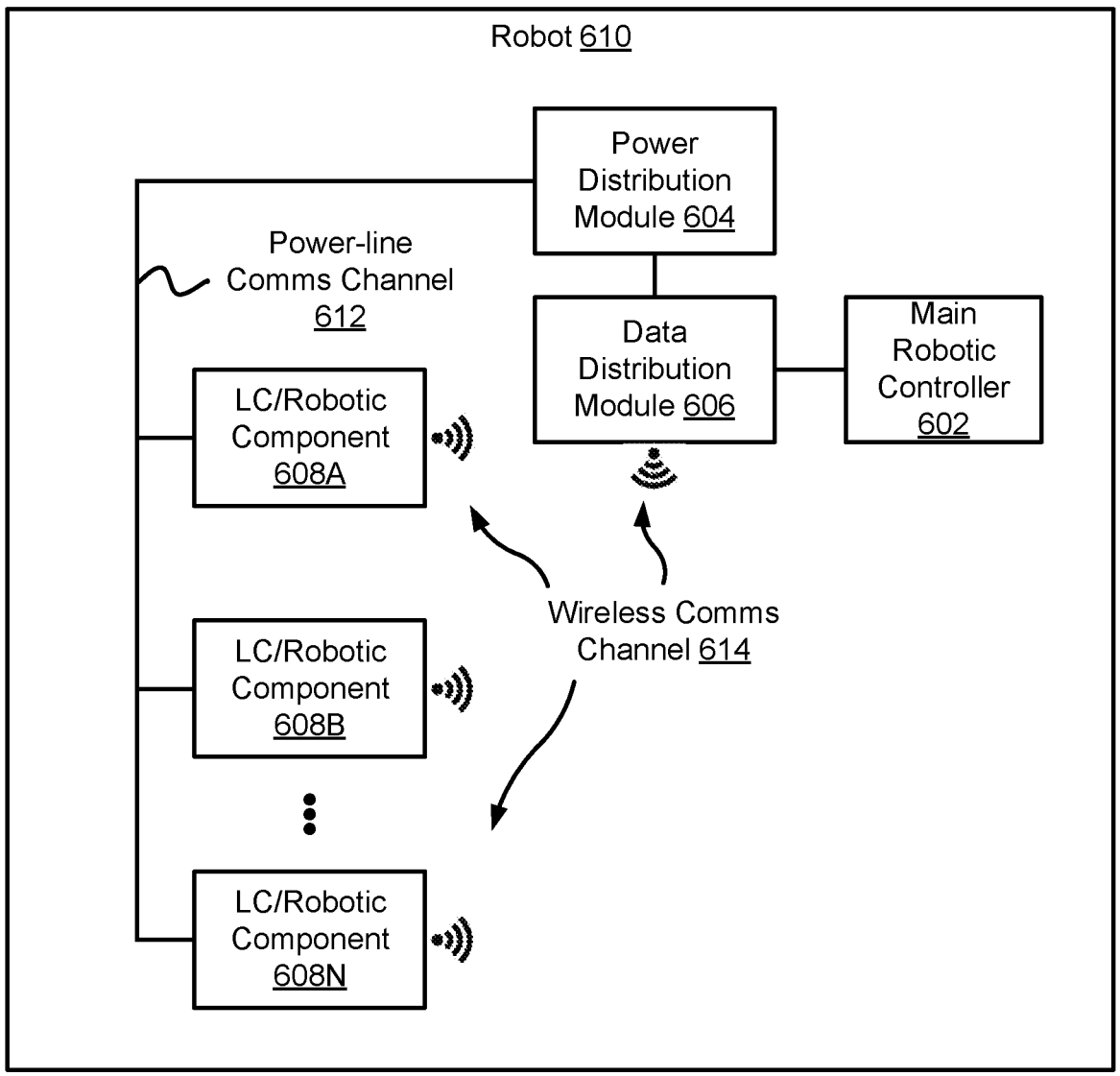

FIG. 5B illustrates an alternative configuration altering what is shown in FIG. 5A. FIG. 5B is a block diagram illustrating an example network configuration for a robot 510B. As shown in FIG. 5B, the robotic components 508A-508N can be connected in a ring topology (instead of the line topology shown in FIG. 5A) with respect to the main robotic controller 502 and/or data distribution module 506 via the cable comms channel 514B. In the ring topology shown in FIG. 5B, the main robotic controller 502 or data distribution module 506 can communicate with the local controllers of the robotic components 508A-508N in series such that the cable comms channel 514B goes from the data distribution module 506 to the local controller of the robotic component 508A, then to the robotic component 508B, and onward in sequence through the robotic components to the robotic component 508N. In the ring topology, the cable comms channel 514B then goes back to the data distribution module 506. In this ring topology, the data distribution module 506 or main robotic controller 502 can also send and/or receive data in the backward order through the robotic components (i.e. robotic component 608N then to robotic component previous to 608N and onward in reverse sequence to robotic component 608B, then 608A, then back to the data distribution module 506 and/or main robotic controller 502).

In the ring topology of FIG. 5B, if a communication failure is detected while data flows in a first direction (e.g. robotic component 608N does not receive/send data, due to damage in the cable comms channel 514B or other failure), then the cable comms channel 514B can be used in a reverse direction (e.g., flowing from the data distribution module 506 to the robotic component 608N and so forth to 608A) to transfer data between the data distribution module 506 or main robotic controller 502 and robotic component 608N in the reverse direction. FIG. 6 is a block diagram illustrating another example network configuration for a robot 610 comprising a wireless communication channel 614 and a power-line communication channel 612 (collectively referred to as network channels 612, 614). The wireless communication channel 614 can be part of a computer network that uses wireless data connections between network nodes, which can include a data distribution module 606 in network connection with a main robotic controller 602 and a plurality of local controllers, some or all of which can be associated with robotic components 608A-N. The network channels 612, 614 may be part of a local area network (LAN) used for communications between the main robotic controller 602 and the local controllers, such as those associated with the robotic components 608A-N.

In one example, the wireless communication channel 614 can serve as the primary network channel for the robot 610, and the power-line communication channel 612 can serve as the redundant or backup (i.e., secondary) network channel for the robot 610. However, in other examples, the power-line communication channel 612 can be designated the primary network channel and the wireless communication channel 614 may be designated the secondary network channel.

As in the previous examples, the data distribution module 606 can distribute communications between the main robotic controller 602 and the local controllers, such as those associated with the robotic components 608A-N. In the example illustrated in FIG. 6, the data distribution module 606 can encode a communication received from the main robotic controller 602 into duplicate data signals and send one of the data signals over the wireless communications channel 614 and send the other data signal to a power distribution module 604 configured to send the data signal over the power-line channel 612. Likewise, the local controllers can encode duplicate data signals and send one of the data signals over the wireless communications channel 614 and send the other data signal to a power distribution module 604 configured to send the data signal over the power-line channel 612.

At least one of the local controllers or the main robotic controller, such as one or more associated with a respective one of the robotic components 608A-N, can receive the duplicate data signals over the network channels 612/614 and can compare the data signals in order to determine the signal integrity of the data signals. In the case that the one or more local controllers, such as those associated with the robotic components 608A-N, determines that the signal integrity of the data signal sent over the wireless communications channel 614 is degraded, the local controllers or the main robotic controller can ignore or discard the data signal and select the data signal received over the power-line communications channel 612 for processing.

It is to be understood that, although the robotic components 608A-N do not specifically show local controllers and controlled components as shown in FIG. 2, each of the robotic components 608A-N can have or be associated with a local controller and a controlled component in network communication with (e.g., via power line comms channel 612 and/or wireless comms channel 614) the main robotic controller 602, power distribution module 604, and/or data distribution module 606 in a similar manner in which the local controller 206 and controlled component 214 are in network communication (via network channels 208, 210, and 212) with the main robotic controller 202 (including a power distribution module and/or data distribution module) as shown in FIG. 2. It is further to be understood that, elsewhere in this disclosure in which it is described that the power distribution module 604 and/or data distribution module 606 transfers data, power, and/or signals between each of the robotic components 608A-N, that such data, power, and/or signals are transferred via one or more of the local controller and the controlled component of the associated robotic component(s) 608A-N.

Figure 7A:
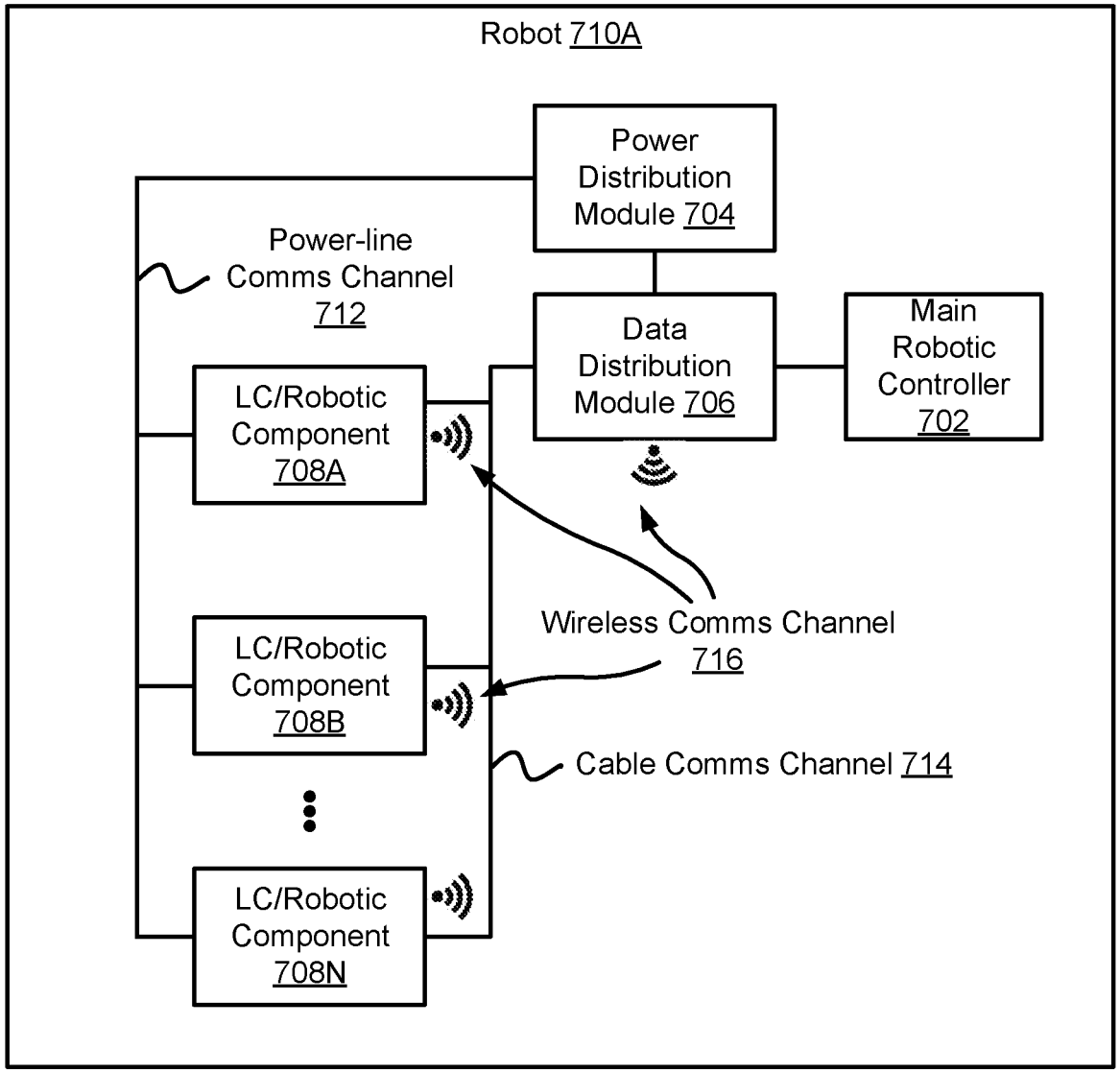

FIG. 7A is a block diagram illustrating yet another example network configuration for a robot 710A comprising a primary network channel, a secondary network channel, and a tertiary network channel. As illustrated, any of the network channels described herein can include a cable communication channel 714, a wireless communication channel 716, and/or a power-line communication channel 712 (collectively referred to as network channels 712, 714, 716). By way of example, the cable communication channel 714 can act as the primary network channel, the wireless communication channel 716 can act as the secondary network channel, and the power-line communication channel 712 can act as the tertiary network channel. Of course, as in other examples, a different network hierarchy is possible and contemplated, and as such, the specific hierarchy discussed here and illustrated in FIG. 7A is not intended to be limiting in any way.

Similar to the preceding examples, a data distribution module 706 can distribute duplicated data signals in parallel between a main robotic controller 402 and the local controllers, such as those respectively associated with a plurality of robotic components 708A-N, using the network channels 712, 714, 716. That is, the data distribution module 706 can duplicate a data signal to create a first, second, and third data signal, and the data distribution module 706 can send the first data signal over the primary communication channel (e.g., the cable communication channel 716), send the second data signal over the secondary network channel (e.g., the wireless communication channel 716), and send the third data signal over the tertiary network channel (e.g., the power-line communication channel 712).

At least one of the local controllers, such as one or more associated with a respective one or more of the robotic components 708A-N, as well as the main robotic controller 702, can receive the duplicate data signals over the network channels 712, 714, 716 and can compare the three data signals to determine the signal integrity of the data signal associated with the primary network channel. In the case that the signal integrity of the data signal sent over the primary network channel is degraded, the one or more local controllers, such as one or more associated with a respective one of the robotic component 708A-N, or the main robotic controller 702 can select the data signal received over the secondary network channel for processing. In the case that the signal integrity of both the data signals sent over the primary and secondary network channels indicates degradation of the data signals, then the data signal sent over the tertiary network channel can be processed and used.

Figure 7B:
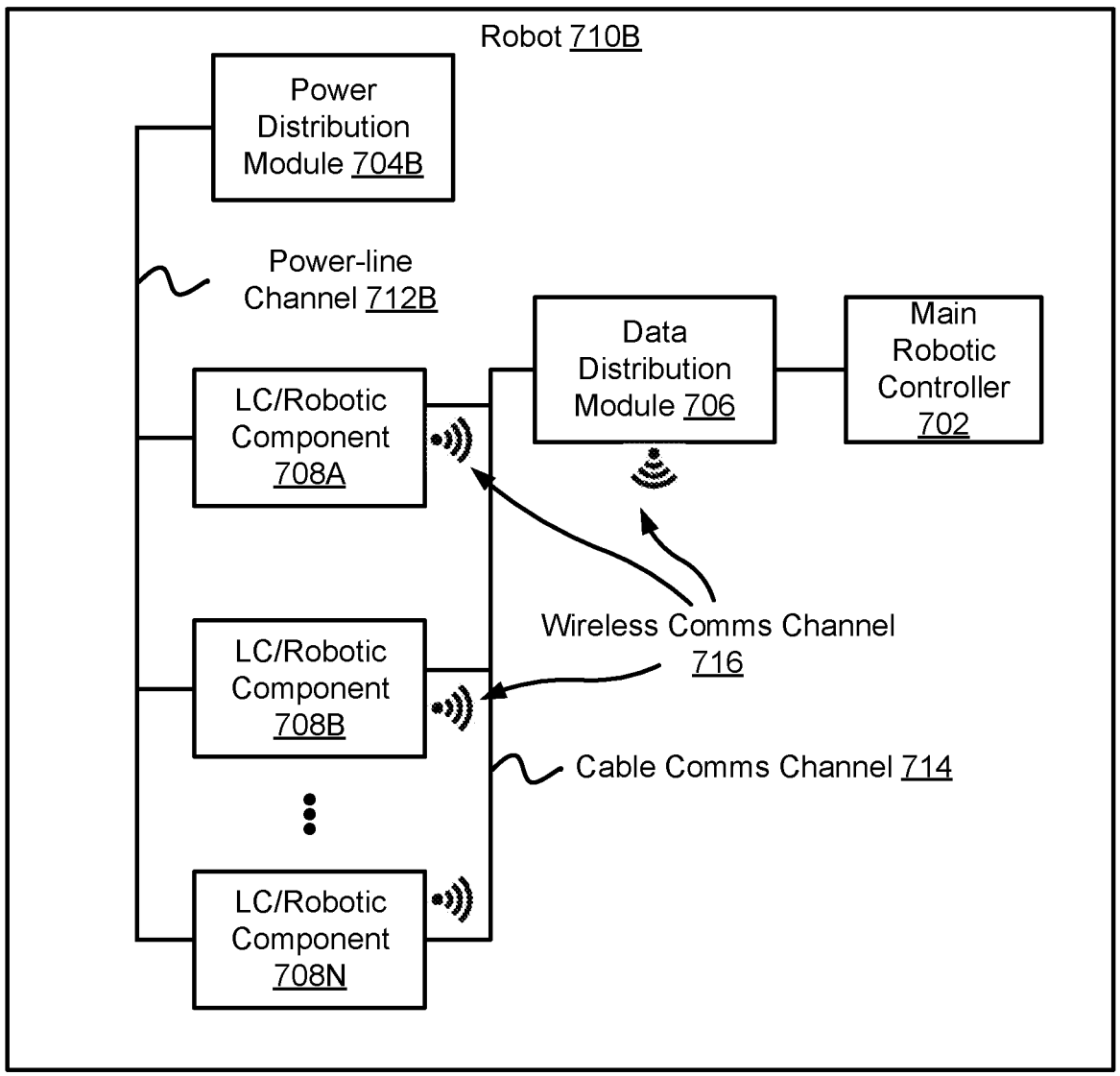

It is to be understood that the power-line communication channel 712 can be omitted from the robot 710A of FIG. 7A and still be a working redundant communication network configuration. In other words, the robotic components 708A-708N can be powered by a power distribution module 704B through a power-line channel 712B. As shown in FIG. 7B, power distribution module 704B is not connected to data distribution module 706 and does not receive data signals for control of the robotic components 708A-708N, such that only a primary and secondary network channel are present for facilitating communication between the main robotic controller 702, data distribution module 706, and the robotic components 708A-708N. For example, FIG. 7B is a block diagram illustrating yet another example network configuration for a robot 710B comprising a primary network channel and a secondary network channel being the cable communication channel 714 and the wireless communication channel 716.

Similar to the preceding examples, duplicated data signals can be sent in parallel between a main robotic controller 402 and the local controllers, such as those respectively associated with a plurality of robotic components 708A-N, using the network channels 714 and 716. That is, duplicate data signals can be created by the local controllers or the main robotic controller 702 to create first and second data signal, and can send the first data signal over the primary communication channel (e.g., the cable communication channel 716) and send the second data signal over the secondary network channel (e.g., the wireless communication channel 716).

At least one of the local controllers, such as one or more associated with a respective one or more of the robotic components 708A-N, or the main robotic controller 702 can receive the duplicate data signals over the network channels 714, 716 and can compare the data signals to determine the signal integrity of the data signal associated with the primary network channel. In the case that the signal integrity of the data signal sent over the primary network channel is degraded, the one or more local controllers, such as one or more associated with a respective one of the robotic component 708A-N, or the main robotic controller 702 can select the data signal received over the secondary network channel for processing.

It is to be understood that, although the robotic components 708A-N do not specifically show local controllers and controlled components as shown in FIG. 2, each of the robotic components 708A-N can have or be associated with a local controller and a controlled component in network communication with (e.g., via power line comms channel 712, cable comms channel 714, and/or wireless comms channel 716) the main robotic controller 702, power distribution module 704, and/or data distribution module 706) in a similar manner in which the local controller 206 and controlled component 214 are in network communication (via network channels 208, 210, and 212) with the main robotic controller 202 (including power distribution module and/or data distribution module) in FIG. 2. It is further to be understood that, elsewhere in this disclosure in which it is described that the power distribution module 704 and/or data distribution module 706 provides data, power, and/or signals to each of the robotic components 708A-N and that such data, power, and/or signals are provided to one or more of the local controller and the controlled component of the associated robotic component(s) 708A-N.

The signal data of the primary, secondary, tertiary, and any other number of network channels (e.g., wireless comms channels 614, 716) can be processed in accordance with a method to determine signal integrity of the data signals of each network channel. For example, with reference to the system 200 shown in FIG. 2, the local controller 206 associated with the robotic component 204 or the main robotic controller 202 can determine signal integrity of the first and second data signals of respective first and second network channels by comparing a number of data packets contained in each of the first and second data signals, and the local controller 206 or the main robotic controller 202 can determine that the first data signal is degraded when a number of data packets contained in the first data signal is less than a number of data packets contained in the second data signal. Data packet refers to a unit of data made into a single package that travels along a given network path. In a computer network, a data packet can be a formatted unit of data carried by a packet-switched network. The data packet can include control information for delivering the network packet to a network destination, such as the main robotic controller 202, and/or user data or payload comprising a command or instruction intended for a robotic component 204 (e.g., the local controller 206 of the robotic component 204).

In another example configuration, the local controller 206 can determine signal integrity of the first and second data signals by comparing the signal strengths and signal to noise ratios of the first and second data signals. Signal strength may refer to transmitter power output as received by a receiver, e.g., milliwatts (mW), received signal strength indicator (RSSI), or decibels in relation to a milliwatt (dBm). When a signal strength and signal to noise ratio of the first data signal is less than a signal strength and signal to noise ratio of the second data signal, the local controller 206 or main robotic controller 202 can determine that the first data signal is degraded.

As indicated above, in response to determining that the first data signal received over the primary network channel 208 is degraded, the local controller 206 or main robotic controller 202 can ignore or discard the first data signal and select the second data signal received over the secondary network channel 210. The local controller 206 can process the second data signal to obtain a command or instruction intended for the local controller 206 of the robotic component 204, and execute the command or instruction to cause the local controller 206 of the robotic component 204 to control the controlled component 214 to perform an action based on the command or instruction. If the main robotic controller 202 is receiving the data, the main robotic controller 202 can process the second data signal to obtain a command or instruction intended for the main robotic controller 202 of the robotic component 204, and execute the command or instruction to cause the main robotic controller 202 of the robotic component 204 to perform an action based on the command or instruction. That is, the local controller 206 and the main robotic controller 202 can each failover to the secondary network channel 210 to receive/send commands to prevent a shutdown of the robot 100 due to network degradation or failure in the primary network channel 208 that results in a communication fault. Thus, network redundancy is accomplished by monitoring the primary network channel 208 for communication faults and failing over to the secondary network channel 208 when signal degradation in the primary network channel 208 is detected, which can indicate a network failure in the primary network channel 208

In the case that a communication fault is detected, operation of the robot 100 can continue, a remedial measure can be taken (e.g., the robot can be caused to enter a safe operating mode, and/or an operator of the robot 100 can be notified, or others). For example, basic operations of the robot 100 (e.g., drive control, motion control, balance control, etc.) can be maintained via the redundancy provided by the secondary network channel 210 to allow the robot 100 to be placed in a safe position or operating state (e.g., a non-standing or a self-standing position) or to be safely returned to a service dock or station. In another example, if a communication fault associated with the primary network channel 208 is detected by the local controller 206, such as the one associated with the robotic component 204, the local controller 206 can notify the main robotic controller 202 of the communication fault, and the main robotic controller 202 can switch to a service mode that allows the robot 100 to minimally function and allows the robot 100 to get to a service station, if needed. Similarly, if a communication fault is detected by the main controller 202 the main controller 202 can switch to a service mode that allows the robot 100 to minimally function and allows the robot 100 to get to a service station if needed.

In one example configuration, communications sent over the redundant network communication system can be limited to communications related to basic operations of the robot 100. For example, in order to safeguard the robot 100 from experiencing an abnormal or an unsafe condition, the secondary network channel 210 can be reserved for commands and data associated with basic operations of the robot 100 (e.g., drive control, motion control, balance control, etc.). Non-basic or non-essential commands can be sent over the primary network channel 208. As an example, the main robotic controller 202 can duplicate data signals containing basic or essential commands for basic operation of the robot 100 and send the data signals in parallel over the primary and secondary network channels 208, 210 to the local controller 206. When received over the primary network channel 208, the local controller 206 can identify the data signals as containing basic or essential commands, for example, by inspecting the data packet for a basic or essential command indicator, and compare the data signal with the data signal received over the secondary network channel 210 to determine the signal integrity of the primary network channel 208. In the event that the controller 206 detects a communication fault associated with the primary network channel 208, the controller 206 can failover to the data signal received over the secondary network channel 210 to receive the basic or essential commands, thereby allowing the robot 100 to maintain basic operations and avoid an uncontrolled failure of the robot 100.

Figure 9:
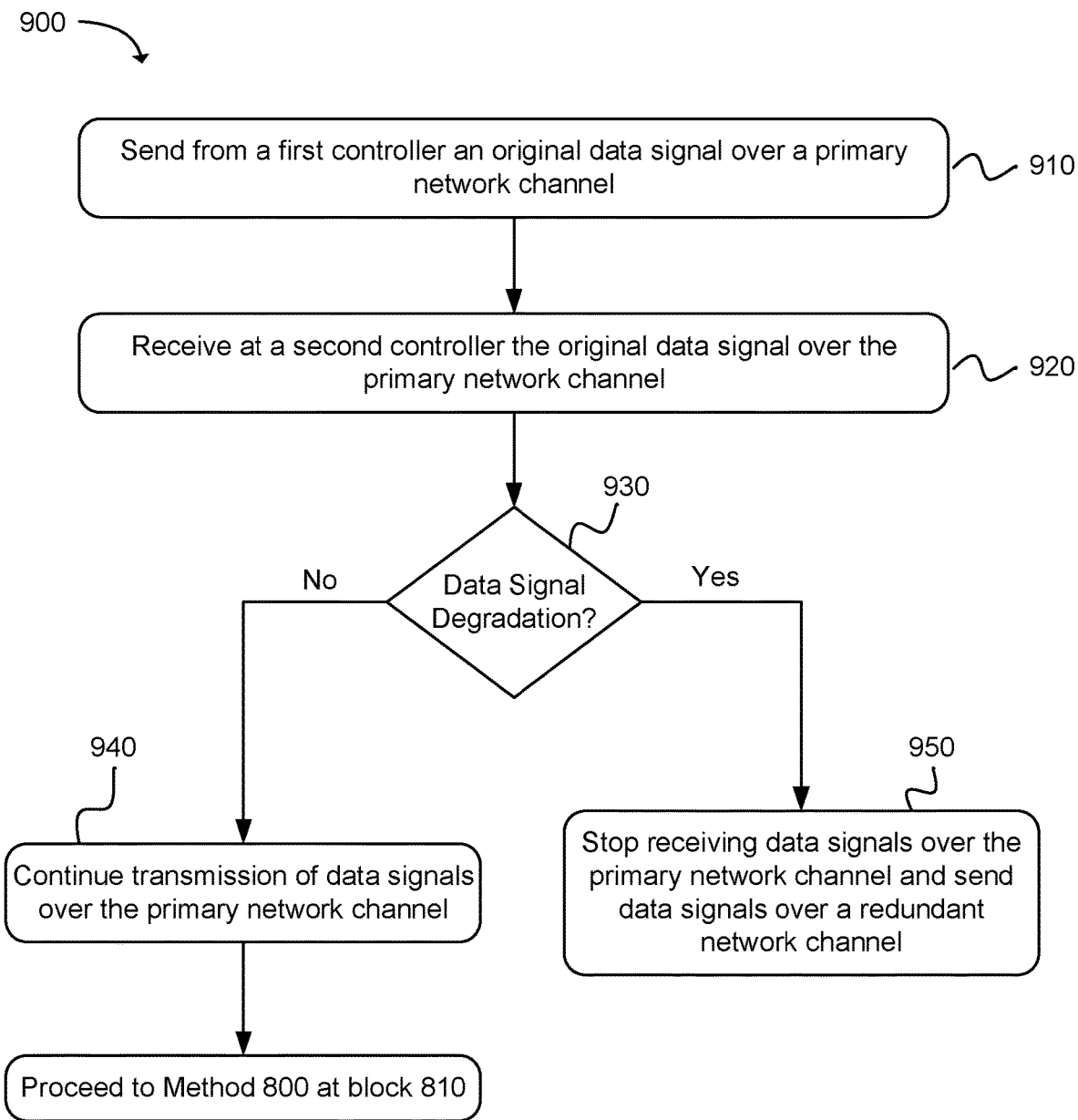
FIG. 9 is a flow diagram that illustrates an example method for detecting a communication fault in a robot using network channel redundancy.

In one example, as described in greater detail in association with FIG. 9, the local controller 206 associated with the robotic component 204 can log signal integrity metrics for the first and second data signals to allow diagnosis of the degradation of the first data signal. For example, as part of comparing first and second data signals, the local controller 206 can write data signal metrics (e.g., signal strength and noise level, mW, RSSI, dBm, etc.) to a log (e.g., a network system log). The log can be stored in a memory device (not shown) located on the robot 100 or located in an external data store, such as a remote data store, a data center, a service provider environment (e.g., cloud environment), or the like.

Moreover, when a communication fault is detected, the local controller 106 can generate a system notification to indicate that a problem with one or both of the primary and secondary network channels 208, 210 has been detected. The system notification can provide a user with information that allows the user to return the robot 100 to a service location, or perform some other remedial action to avoid damage to the robot 100 and/or injury to the user and/or personnel in the surrounding area of the robot. For example, the system notification can specify the type of failure, robotic component(s) 204 affected by the failure, instructions for correcting the failure and/or bypassing the failure, etc. The system notification can be displayed on a display device of the robot 100 and/or user device, played on an audio output device of the robot 100 and/or user device, sent to a user device (e.g., application notification, SMS message, email, etc.), and the like.

In one example, after detecting a communication fault in the primary network channel 208 and switching to the secondary network channel 210 to transfer communications between the main robotic controller 202 and the local controller 206, the local controller 206 or the main robotic controller 202 can continue to monitor the primary network channel 208 to determine whether the primary network channel 208 recovers from the degradation or failure. For example, the local controller 206 and/or main robotic controller 202 can continue to self-monitor the primary network channel 208 and individually self-diagnose communication faults over the primary network channel 208 using checksum algorithms or other self-diagnostic or self-verification techniques described herein. In the event that the primary network channel 208 recovers from the degradation, the local controller 206 and/or the main robotic controller 202 can revert back to sending data signals over the primary network channel 208 for communicating between the local controller 206 and the main robotic controller 202. In one example, prior to reverting back to the primary network channel 208, the local controller 206 and/or main robotic controller 202 can continue to monitor the signal integrity of the primary network channel 208 for a period of time (e.g., 20 seconds, 60 seconds, 120 seconds, etc.), and then revert back to the primary channel 208 if signal integrity of the primary network channel 208 is maintained for the period of time.

Alternatively, or in addition to the self-diagnostics, in the event that a problem with the primary network channel 208 is temporary (e.g., temporary signal interference), the local controller 206 and/or main robotic controller 202 can continue to compare data signals received over both the network channels 208, 210 so as to detect whether the primary network channel 208 is restored to full performance. In the case that the local controller 206 and/or the main robotic controller 202 detects that the primary network channel 208 has recovered, the local controller 206 and/or the main robotic controller 202 can revert back to the primary network channel 208 for transferring communications between the main robotic controller 202 and the local controller 206. In one example, prior to reverting back to the primary network channel 208, the local controller 206 and/or the main robotic controller 202 can continue to monitor the signal integrity of the primary network channel 208 for a period of time (e.g., 20 seconds, 60 seconds, 120 seconds, etc.), and then revert back to the primary channel 208 if signal integrity of the primary network channel 208 is maintained for the period of time.

Figure 8:
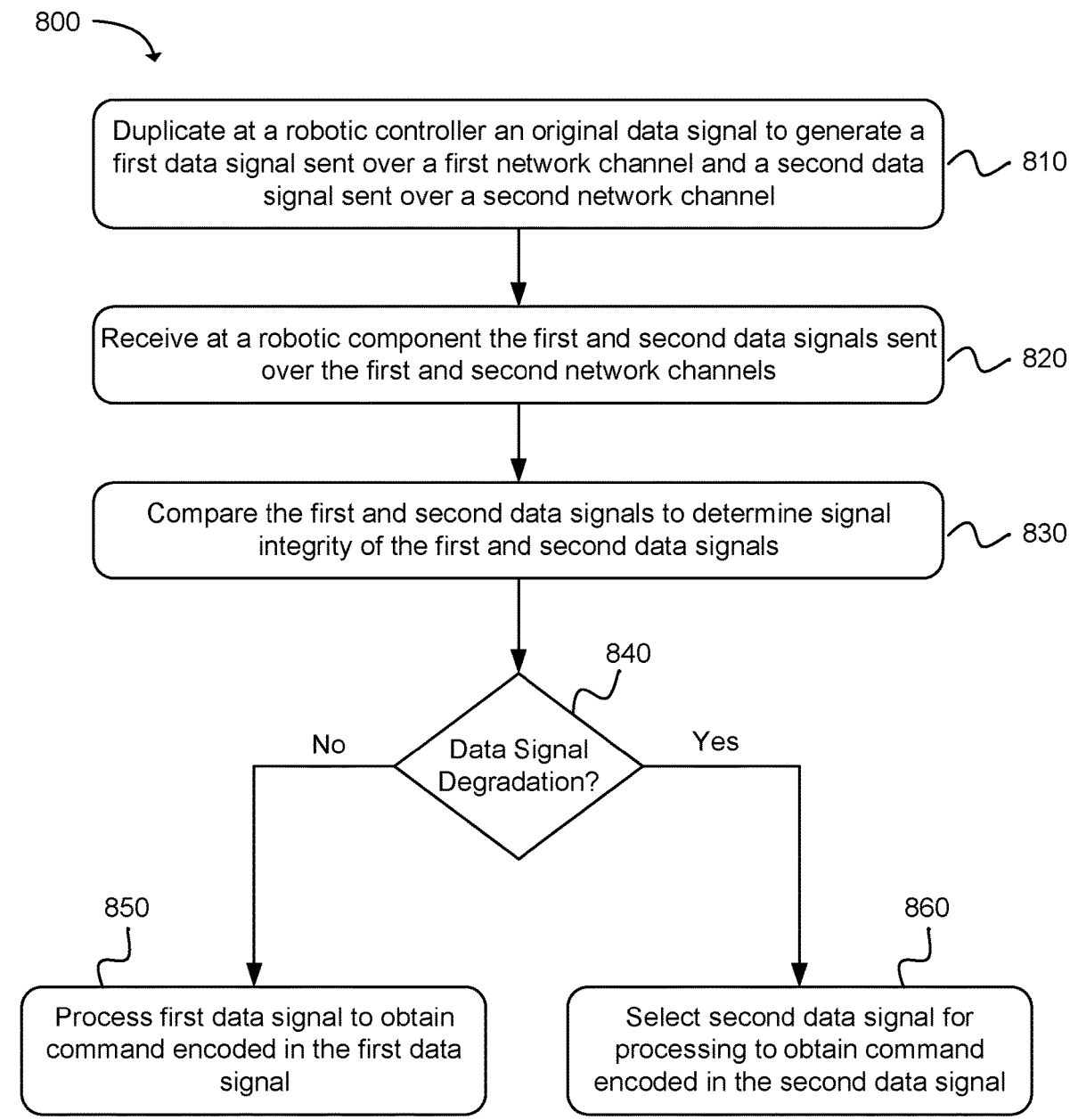
FIG. 8 is a flow diagram that illustrates an example method for detecting a communication fault in a robot using network channel redundancy.

FIG. 8 is a flow diagram illustrating an example method 800 for redundant network communication in a robot using any of the example redundant network communications system configurations discussed herein. As in block 810, a main robotic controller can generate duplicate data signals having an encoded command or instruction for directing or regulating the movement and function of the robot. The main robotic controller can then send the first data signal over a first network channel, and send the second data signal over a second network channel, wherein the first and second network channels communicatively connect the main robotic controller to a local controller part of or otherwise associated with the robotic component. Of course, it is contemplated that the method 800 can comprise the generation of additional data signals that can be sent over additional network channels, as is described above and shown in FIG. 7A.

As in block 820, the local controller, in one example as associated with the robotic component, can receive the first data signal sent over the first network channel, and receive the second data signal sent over the second network channel (or any other data signals sent over additional network channels). In response to receiving the first and second data signals, the local controller can compare the first data signal with the second data signal to determine signal integrity associated with the first and second network channels, as in block 830. In one example, comparing the first and second data signals can comprise comparing a number of data packets received in each of the first and second data signals. In another example, comparing the first and second data signals can comprise comparing a signal strength and a signal to noise ratio of the first data signal to a signal strength and a signal to noise ratio of the second data signal.

As in block 840, in the case that degradation of the data signal received over the first network channel is not detected, then as in block 850, the first data signal can be processed to obtain the command encoded in the first data signal and the local controller can cause the controlled component of the robotic component to perform the command. However, in the case that degradation of the data signal received over the first network channel is detected, then as in block 860, the local controller can process the second data signal received over the second network channel to obtain the command encoded in the second data signal, and the local controller can cause the controlled component of the robotic component to perform the command. Namely, in either case, performing the command comprises the local controller executing instructions obtained from one of the data signals that actuate the controlled component of the robotic component in some way (or that cause the local controller to initiate another function or operation).

While the method 800 is described from a reference frame of data being created at the main robotic controller and sent to the local controller, it is to be understood that the main robotic controller and local controller support bi-directional communication. Therefore, the method 800 can also be utilized in similar fashion in a situation where data is sent from the local controller to the main robotic controller.

In one example configuration of a redundant network communication system for a robot, a third network channel can be used to provide additional network channel redundancy. For example, the main robotic controller can generate three duplicate data signals and send the third data signal over a third network channel in parallel with the sending of the first and second data signals over the first and second network channels. When received at the local controller, the third data signal can be compared to the first and second data signals to determine signal integrity degradation of any of the first, second, or third data signals. In one example, the first, second, and third network channels can be any combination of cable communication channels, power-line communication channels, and/or wireless communication channels.

Other methods of diagnosing communication faults can be carried out instead of or in addition to method 800. FIG. 9 is a flow diagram illustrating such an example method 900 for redundant network communication in a robot using any of the example redundant network communications system configurations discussed herein. Method 900 illustrates processes for individually diagnosing communication faults on independent network channels without the need for duplicating and comparing data signals sent over multiple network channels. As in block 910, a main robotic controller (as an example of a first controller) can generate an original data signal having an encoded command or instruction for directing or regulating the movement and function of the robot. The main robotic controller can then send the first data signal over a primary network channel out of the first network channel or the second network channel, wherein the first and second network channels communicatively connect the main robotic controller to a local controller (an example of a second controller) part of or otherwise associated with the robotic component. Of course, it is contemplated that the method 900 can comprise the generation of additional data signals that can be sent over additional network channels, as is described above and shown in FIG. 7A.

As in block 920, the local controller (e.g., the second controller), in one example as associated with the robotic component, can receive the data signal sent over the primary network channel. In response to receiving the data signal, the local controller determine signal integrity associated with the primary network channel to see if any data signal degradation has occurred, as in block 930. In one example, the self-diagnostic features of the used to individually diagnose signal integrity on the primary network channel can be carried out using checksum algorithms and processes as error detection mechanisms for determining signal degradation. In other examples, the controller can use various mechanisms such as using Error Correction Code, parity checks, missed data packet detection, time-out mechanisms and algorithms, cyclic redundancy checks. For example, the controller can detect missed data packets over the network channel by observing that the controller does not receive the packet within a prescribed amount of time. These and any other methods known by those of ordinary skill in the art for detecting network channel issues and signal degradation can be used to self-diagnose network channel and signal health in a robotic network.

As in block 940, in the case that degradation of the data signal received over the primary network channel is not detected, the local controller can remain defaulted to receive network data signals over the primary network channel and can further move to the block 810 of the method 800 illustrated in FIG. 8 for further checking of data signal integrity through comparison of duplicate data signals sent over multiple network channels (e.g., primary, secondary, tertiary network channels).

In block 950, in the case that degradation of the data signal received over the primary network channel is detected, then the local controller can stop receiving and/or considering the data signals received over the primary network channel. In order to obtain the command encoded in the data signal for operation of the controlled component of the robotic component to perform the command, the local controller can instead move to receive data signals sent over a redundant or secondary network channel to ensure reception of data signals by the local controller and proper operation of the robot continues. Namely, in either case, performing the command comprises the local controller executing instructions obtained from one of the data signals that actuate the controlled component of the robotic component in some way (or that cause the local controller to initiate another function or operation).

It is to be understood that individual diagnosing of network channels (e.g., method 900) and comparison diagnosing of network channels (e.g., method 800) can be performed in tandem with each other such that each network channel (e.g., primary, secondary, tertiary, and so on) are individually diagnosed as well as comparatively diagnosed for network communication faults. The comparative diagnosis of method 800 can catch network communication faults that can be missed by the individual diagnosis of method 900. It will be further appreciated that each of methods 800 and 900 can be performed separately from each other. In other words, a user may choose to only individually diagnose network channels as in method 900 without using any method for comparative data signal analysis. In such a case, the method 900 would not move on to method 800 after block 940 but would instead terminate or return to block 910 for continued diagnosis of network channels. Alternatively, a user can choose to only use comparative methods (e.g., method 800) of network channel diagnosis without individually diagnosing statuses of network channels.

While the method 900 is described from a reference frame of data being created at the main robotic controller and sent to the local controller, it is to be understood that the main robotic controller and local controller support bi-directional communication. Therefore, the method 900 can also be utilized in similar fashion in a situation where data is sent from the local controller to the main robotic controller.

In one example configuration of a redundant network communication system for a robot, a third network channel can be used to provide additional network channel redundancy. For example, the main robotic controller can individually diagnose a third network channel (as well as more additional network channels) in parallel with the first and second network channels. In one example, the first, second, and third network channels can be any combination of cable communication channels, power-line communication channels, and/or wireless communication channels.

Figure 10:
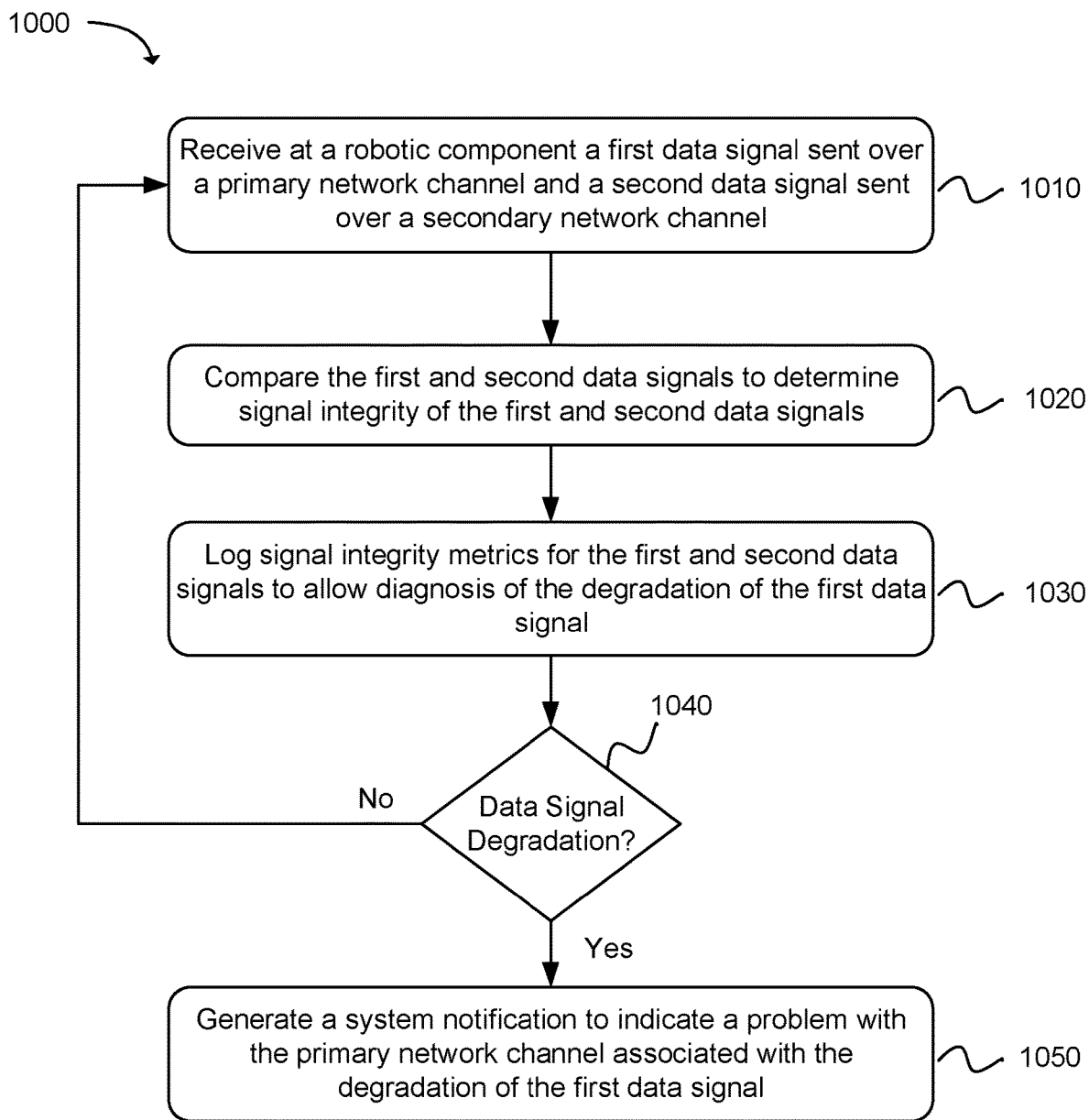
FIG. 10 is a flow diagram illustrating an example method for performing actions in response to detecting a communication fault in a robot.

FIG. 10 is a flow diagram that illustrates an example method 1000 for performing one or more remedial actions in response to detecting a communication fault in a robot. As shown in blocks 1010 and 1020, the method 1000 can include the method steps of method 800 described earlier to receive data signals sent over a primary and secondary network channel at a local controller, such as one associated with a robotic component, and compare the data signals to determine signal integrity of the primary network channel. As part of performing the comparison of the data signals, the local controller, or another processor, can generate signal integrity metrics. Illustratively, the signal integrity metrics can include measurements of signal strength and signal to noise ratio, mW, RSSI, dBm, single bit and multiple bits errors, burst error, missed packets, and other metrics. As in block 1030, the local controller, or other processor, can write the signal integrity metrics to a system log to allow the signal integrity metrics to be used to diagnose communication faults in the primary and secondary network channels. The system log can be stored in a memory device on the robot or a storage device located in an external data store, such as a remote data store, a data center, a service provider environment (e.g., cloud environment), or the like.

As in block 1040, in the case that comparison of the data signals indicates signal degradation in the primary network channel, then as in block 1050, a system notification can be generated to indicate to a user that there is a problem with the primary network channel. The system notification can provide a user with information that allows the user to return the robot to a service location or perform some other action to avoid damage to the robot and/or injury to a user. Illustratively, the system notification can specify the type of failure, robotic component(s) affected by the failure, and/or instructions for correcting the failure and/or bypassing the failure, etc. The system notification can be displayed on a display device of the robot and/or user device, played on an audio output device of the robot and/or user device, sent to a user device (e.g., application notification, SMS message, email, etc.), and the like.

While the method 1000 is described from a reference frame of data being received at the local controller, it is to be understood that the main robotic controller and local controller support bi-directional communication. Therefore, the method 900 can also be utilized in similar fashion in a situation where data is received at the main robotic controller.

Figure 11:
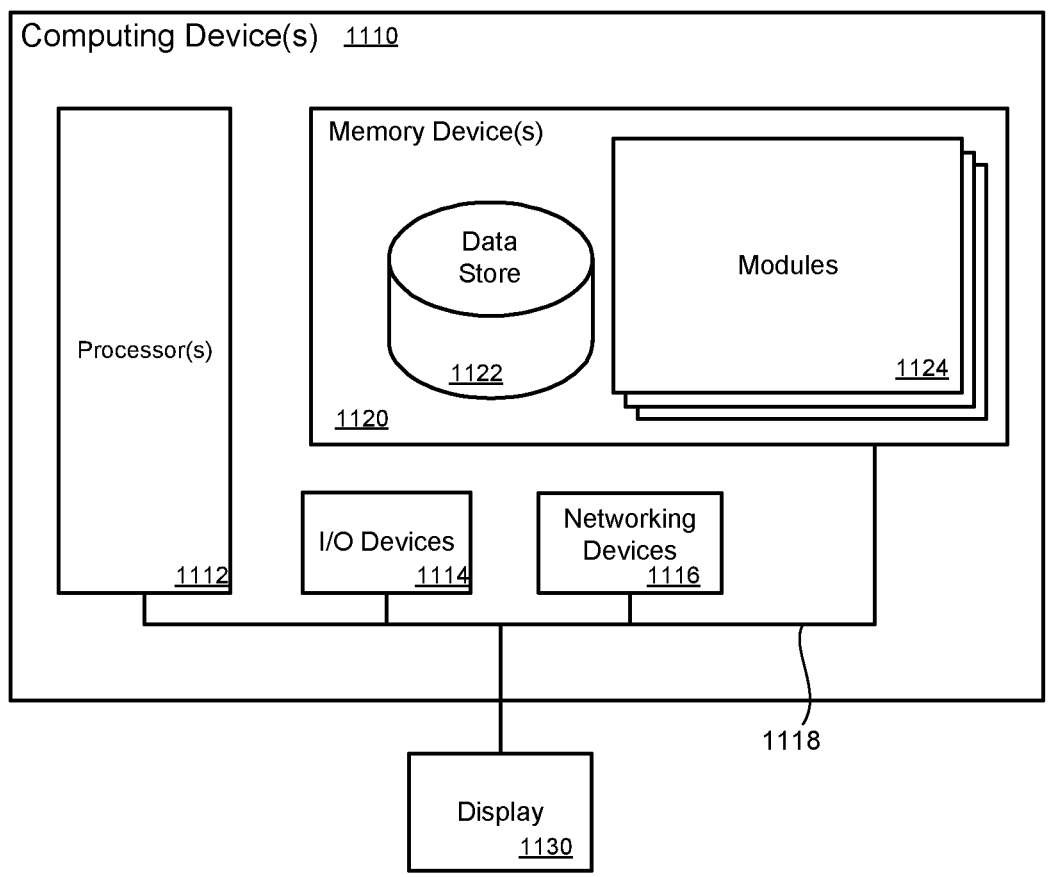
FIG. 11 is block diagram illustrating an example of a computing device that may be used to implement the technology disclosed herein.

FIG. 11 illustrates a computing device 1110 on which modules of this technology can execute. The computing device 1110 is shown at a high-level and can be used as a main robotic controller and/or a local controller associated with a robotic component. The computing device 1110 can include one or more processors 1112 that are in communication with memory devices 1120. The computing device 1110 can include a local communication interface 1118 for the components in the computing device. For example, the local communication interface 1118 may be a local data bus and/or any related address or control busses as may be desired.

The memory 1120 can contain modules 1124 that are executable by the processor(s) 1112 and data for the modules 1124. In one example, the memory 1120 can contain a main robotic controller module, a robotic component controller module, data distribution module, power distribution module, and other modules. The modules 1124 can execute the functions described earlier. A data store 1122 can also be located in the memory 1120 for storing data related to the modules 1124 and other applications along with an operating system that is executable by the processor(s) 1112 and/or processors of the modules 1124, which comprise the local controllers, such as those associated with a robotic component.

Other applications can also be stored in the memory 1120 and can be executable by the processor(s) 1112. Components or modules discussed in this description can be implemented in the form of software using high-level programming languages that are compiled, interpreted or executed using a hybrid of the methods.

The computing device 1110 can also have access to I/O (input/output) devices 1114 that are usable by the computing device 1110. In one example, the computing device 1110 can have access to a display 1130 to allow output of system notifications. Networking devices 1116 and similar communication devices can be included in the computing device. The networking devices 1116 can be wired or wireless networking devices that connect to the internet, a LAN, WAN, or other computing network.

The components or modules that are shown as being stored in the memory device 1120 can be executed by the processor(s) 1112. The term "executable" can mean a program file that is in a form that can be executed by a processor 1112. For example, a program in a higher-level language can be compiled into machine code in a format that can be loaded into a random-access portion of the memory device 1120 and executed by the processor 1112, or source code can be loaded by another executable program and interpreted to generate instructions in a random-access portion of the memory to be executed by a processor. The executable program can be stored in any portion or component of the memory device 1120. For example, the memory device 1120 can be random access memory (RAM), read only memory (ROM), flash memory, a solid-state drive, memory card, a hard drive, optical disk, floppy disk, magnetic tape, or any other memory components.

The processor 1112 can represent multiple processors and the memory device 1120 can represent multiple memory units that operate in parallel to the processing circuits. This can provide parallel processing channels for the processes and data in the system. The local communication interface 1118 can be used as a network to facilitate communication between any of the multiple processors and multiple memories. The local communication interface 1118 can use additional systems designed for coordinating communication such as load balancing, bulk data transfer and similar systems.

While the flowcharts presented for this technology can imply a specific order of execution, the order of execution may differ from what is illustrated. For example, the order of two more blocks can be rearranged relative to the order shown. Further, two or more blocks shown in succession can be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions and can even be distributed over several different code segments, among different programs and across several memory devices. Similarly, operational data can be identified and illustrated herein within modules and can be embodied in any suitable form and organized within any suitable type of data structure. The operational data can be collected as a single data set, or can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine-readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A network communication system for a robot for providing redundant network communication to components in the robot, the network communication system comprising:
   a main robotic controller in network communication with one or more robotic components;
   a local controller in network communication with the main robotic controller and a controlled component of the one or more robotic components that is operable based on a data signal comprising control instructions executed by the local controller;
   a first network channel configured to facilitate network communication between the main robotic controller and the local controller to facilitate conveying a first data signal between the main robotic controller and the local controller; and
   a second network channel configured to facilitate network communication between the main robotic controller and the local controller to facilitate conveying a second data signal between the main robotic controller and the local controller;
   wherein the first data signal and the second data signal are configured to be redundant data signals sent respectively over the first network channel and the second network channel.

2. The network communication system of claim 1, wherein the main robotic controller comprises:
   a power distribution module in electrical communication with the local controller of the controlled component via the second network channel;
   a data distribution module in network communication with the local controller of the controlled component via the first network channel and the second network channel,
   wherein the second network channel comprises a first connection that connects the data distribution module to the power distribution module, and a second connection that connects the power distribution module to the local controller.

3. The network communication system of claim 2, wherein the second network channel is configured to facilitate electrical communication between the power distribution module and the local controller to facilitate providing power to the local controller from the power distribution module through the second connection of the second network channel.

4. The network communication system of claim 3, wherein the first connection of the second network channel is configured to facilitate providing the second data signal from the data distribution module to the power distribution module to facilitate providing the second data signal over the second connection of the second network channel to the local controller in tandem with the power provided to the local controller over the second connection from the power distribution module.

5. The network communication system of claim 2, wherein the second data signal being sent over the second network channel between the local controller and the main robotic controller is encoded by one of the main robotic controller and the local controller; and
   wherein the encoded second data signal is decoded by one of the main robotic controller and the local controller.

6. The network communication system of claim 2, further comprising:
   a wireless network channel configured to facilitate network communication between the main robotic controller and the local controller to facilitate conveying a wireless data signal between the local controller and the main robotic controller.

7. The network communication system of claim 6, wherein the first data signal and the wireless data signal are configured to be redundant data signals that are sent separately over the first network channel and the wireless network channel, respectively;
   wherein the wireless data signal comprises one or more of Wi-Fi, Bluetooth, electromagnetic wave transmission, or light transmission of signals.

8. The network communication system in claim 1, wherein the first network channel comprises one of a cable communication channel, a power-line communication channel, or a wireless communication channel, and wherein the second network channel comprises one of a cable communication channel, a power-line communication channel, or a wireless communication channel.

9. The network communication system in claim 8, wherein the wireless communication channel comprises one or more of Wi-Fi, Bluetooth, electromagnetic wave transmission, or light transmission of signals.

10. The network communication system of claim 1, further comprising:
- a power distribution module in electrical communication with the controlled component configured to operate the controlled component; and
- the system further comprising a power line in electrical communication with the controlled component and the power distribution module to facilitate providing electrical power from the power distribution module to the controlled component.

11. The network communication system of claim 10, wherein the controlled component is in network communication with the local controller; and
- wherein the power line is configured act as a third network channel to facilitate network communication between the main robotic controller and the local controller through the power distribution module and the controlled component to facilitate providing a third data signal from the main robot controller over the third network channel to the local controller, in tandem with the electrical power provided to the controlled component over the third network channel from the power distribution module, for operating the local controller.

12. The network communication system of claim 11, wherein the third data signal being sent over the third network channel between the local controller and the main robotic controller is encoded by one of the main robotic controller and the local controller; and
- wherein the encoded third data signal is decoded by one of the main robotic controller and the local controller.

13. The network communication system of claim 11, wherein the first data signal and the third data signal are configured to be redundant data signals that are sent separately over the first network channel and the third network channel, respectively.

14. The network communication system of claim 1, further comprising:
- a plurality of robotic components, each comprising a corresponding instance of the local controller in network communication with the main robotic controller;
- wherein a corresponding instance of the first network channel is provided for each local controller of the plurality of robotic components to facilitate network communication between the main robotic controller and each local controller to facilitate transferring the first data signal between the main robotic controller and each local controller of the plurality of robotic components;
- wherein a corresponding instance of the second network channel is provided for each local controller of the plurality of robotic components to facilitate network communication between the main robotic controller and each local controller to facilitate transferring the second data signal between the main robotic controller and each local controller of the plurality of robotic components; and
- wherein the first data signal and the second data signal are configured to be redundant data signals sent respectively over each first network channel and each second network channel between one or more local controllers of the plurality of robotic components and the main robotic controller.

15. A local controller for controlling a controlled component of a robotic component in a robot, the local controller comprising:
- a first network interface configured to facilitate network communication between a main robotic controller and the local controller over a first network channel to facilitate transferring a first data signal between the main robotic controller and the local controller; and
- a second network interface configured to facilitate network communication between the main robotic controller and the local controller over a second network channel to facilitate transferring a second data signal between the main robotic controller and the local controller;
- wherein the first data signal and the second data signal are configured to be redundant data signals sent respectively to the first network interface and the second network interface.

16. The local controller of claim 15, wherein the first network interface is configured to facilitate network communication between a data distribution module of the main robotic controller and the local controller to facilitate transferring the first data signal between the local controller and the data distribution module.

17. The local controller of claim 15, wherein the second network interface is configured to facilitate electrical communication between a power distribution module of the main robotic controller and the local controller to facilitate transferring electric power for the local controller from the power distribution module.

18. The local controller of claim 17, wherein the second network interface is configured to facilitate network communication between the local controller and a data distribution module of the main robotic controller through the power distribution module to facilitate transferring the second data signal over the second network interface in tandem with the electric power for the local controller over the second network channel.

19. The local controller of claim 15, wherein the first network interface comprises one of a cable communication channel, a power-line communication channel, or a wireless communication channel, and wherein the second network interface comprises one of a cable communication channel, a power-line communication channel, or a wireless communication channel.

20. The local controller in claim 19, wherein one or more of the first network interface and the second network interface comprises one or more of Wi-Fi, Bluetooth, electromagnetic wave transmission, or light transmission of signals.

21. The local controller of claim 15, wherein the local controller is configured to receive an encoded second data signal to the second network interface and to decode the encoded second data signal received by the second network interface.

22. The local controller of claim 15, wherein the local controller is configured to encode the second data signal and send the encoded second data signal over the second network interface to the main robotic controller.

23. The local controller of claim 15, further comprising:
- a third network interface configured to facilitate network communication between the main robotic controller and the local controller over a third network channel to facilitate receiving a third data signal from the main robotic controller for operating the local controller;
- wherein the third network interface is configured facilitate network communication with the controlled component configured to operate the robotic component based on commands from the local controller, the controlled component being in network communication with the local controller and the main robotic controller; and wherein the third network interface is configured to receive the third data signal from the main robotic controller via the third network channel between the controlled component and the local controller.

24. The local controller of claim 23, wherein the local controller is configured to receive an encoded third data signal to the third network interface and to decode the encoded third data signal received by the third network interface.

25. The local controller of claim 23, wherein the local controller is configured to encode the third data signal and send the encoded third data signal over the third network interface to the main robotic controller.

26. The local controller of claim 23, wherein the first data signal and the third data signal are configured to be redundant data signals that are sent separately over the first network channel and the third network channel, respectively.

27. The local controller of claim 26, wherein the instructions, when executed by the at least one processor, cause the local controller to:
transfer a wireless data signal sent over a wireless network channel in parallel with sending of the first data signal and the second data signal,
wherein the wireless data signal is compared to the first data signal and the second data signal to determine signal integrity degradation of any of the first data signal, the second data signal, or the wireless data signal.

28. The local controller of claim 15, further comprising:
a wireless network interface configured to facilitate network communication between the main robotic controller and the local controller over a wireless network channel to facilitate transferring a wireless data signal between the local controller and the main robotic controller.

29. The local controller of claim 28, wherein the first data signal and the wireless data signal are configured to be redundant data signals that are sent separately over the first network channel and the wireless network channel, respectively;
wherein the wireless data signal comprises one or more of Wi-Fi, Bluetooth, electromagnetic wave transmission, or light transmission of signals.

30. The local controller of claim 15, further comprising:
a processor and a memory device including instructions that, when executed by the processor, cause the local controller to:
transfer the first data signal and the second data signal between the main robotic controller and the local controller via the first network interface and the second network interface, wherein the first data signal is transferred via the first network interface, and the second data signal is transferred via the second network interface;
compare the first data signal with the second data signal to determine signal a signal integrity of the first data signal and a signal integrity of the second data signal;
determine a degradation of the first data signal associated with the first network interface when the signal integrity of the first data signal is less than the signal integrity of the second data signal; and
select the second data signal received over the second network interface for processing when the degradation of the first data signal is determined.

31. The local controller in claim 30, wherein the instructions, when executed by the processor, cause the local controller to:
process the second data signal to obtain a command encoded in the second data signal; and
perform the command obtained from the second data signal.

32. The local controller of claim 30, wherein the instructions that, when executed by the processor, cause the robotic component to compare the first and second data signals to determine the signal integrity of the first data signal and the second data signal further:
compare a signal to noise ratio of the first data signal and second data signals; and
determine that a signal to noise ratio of the first data signal is less than a signal to noise ratio of the second data signal.

33. The local controller of claim 30, wherein the instructions that compare the first and second data signals to determine the signal integrity of the first data signal and the signal integrity of the second data signal further cause the robotic component to:
compare a number of data packets contained in the first and a number of data packets contained in the second data signal; and
determine that the number of data packets contained in the first data signal is less than the number of data packets contained in the second data signal.

34. The local controller of claim 30, wherein the instructions, when executed by the processor, cause the local controller to log a signal integrity metric for the first data signal and a signal integrity, metric for the second data signal to allow diagnosis of the degradation of the first data signal.

35. The local controller of claim 30, wherein the instructions, when executed by the at least one processor, cause the local controller to generate a system notification to indicate a problem with the first network channel associated with the degradation of the first data signal.

36. The local controller of claim 30, wherein the main robotic controller and the local controller transfer the first data signal over the first network channel in parallel with transfer of the second data signal over the second network channel.

37. The local controller of claim 30, wherein the instructions, when executed by the at least one processor, cause the local controller to:
transfer a third data signal between the local controller and the main robotic controller over a third network channel in parallel with the first data signal and the second data signal,
wherein the third data signal is compared to the first and second data signals to determine signal integrity degradation of any of the first data signal, the second data signal, or the third data signal.

38. The local controller of claim 37, wherein the first network channel, the second network channel, and the third network channel are any combination of cable communication channels, power-line communication channels, or wireless communication channels.

* * * * *